US012700173B2

(12) United States Patent
Yamaguchi et al.

(10) Patent No.: US 12,700,173 B2
(45) Date of Patent: Aug. 4, 2026

(54) SIGNAL PROCESSING DEVICE AND SIGNAL PROCESSING METHOD

(71) Applicant: NEC Corporation, Tokyo (JP)

(72) Inventors: Yuki Yamaguchi, Tokyo (JP); Taichi Tanaka, Tokyo (JP); Masato Toda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 361 days.

(21) Appl. No.: 18/238,739

(22) Filed: Aug. 28, 2023

(65) Prior Publication Data

US 2024/0193856 A1     Jun. 13, 2024

(30) Foreign Application Priority Data

Sep. 1, 2022     (JP) ................................. 2022-138922

(51) Int. Cl.
*G06T 17/00*     (2006.01)
*G01S 13/90*     (2006.01)
*G06V 10/74*     (2022.01)

(52) U.S. Cl.
CPC .......... *G06T 17/00* (2013.01); *G01S 13/9021* (2019.05); *G06V 10/761* (2022.01)

(58) Field of Classification Search
CPC . G01S 13/9021; G01S 13/9023; G06T 17/00; G06V 10/761
See application file for complete search history.

(56) References Cited

U.S. PATENT DOCUMENTS 5,469,167 A * 11/1995 Polge .................. G01S 13/9047
342/194
2018/0011187 A1     1/2018 Katayama et al.

2020/0072764 A1* 3/2020 Vacanti ................... G01S 7/026
2020/0408902 A1 12/2020 Katayama et al.
2021/0097280 A1* 4/2021 Sharp, III ................ G06T 7/60
2021/0132214 A1* 5/2021 Tanaka ............... G01S 13/9027

FOREIGN PATENT DOCUMENTS

EP          3540462 A1     9/2019
JP       2008-185375 A     8/2008
WO       2008/016153 A1     2/2008
WO       2023/233656 A1    12/2023

OTHER PUBLICATIONS

Extended European Search Report for EP Application No. 23193617, dated on Jan. 19, 2024.
Yuki Yamaguchi et al., "Coherent change detection robust to layover regions using SAR tomography", 14th European Conference on Synthetic Aperture Radar, Jul. 27, 2022, pp. 778-783.

* cited by examiner

*Primary Examiner* — Timothy A Brainard
(74) *Attorney, Agent, or Firm* — Sughrue Mion, PLLC

(57)          ABSTRACT

The signal processing device 10 includes a three-dimensional information with reliability reconstruction unit which generates three-dimensional information with reliability including three-dimensional information involving intensity and an estimated value of a phase at a three-dimensional position reconstructed using observed SAR images and imaging conditions, and information indicating reliability of the three-dimensional information, and a phase signal estimation unit 12 which calculates phase signals for all pixels in an analyzed area for all imaging conditions of SAR images to be analyzed, and calculates the information indicating reliability of the phase signals based on the information indicating reliability of the three-dimensional information.

12 Claims, 23 Drawing Sheets

FIG. 1

| | | INTENSITY CORRELATION | |
|---|---|---|---|
| | | HIGH | LOW |
| PHASE CORRELATION | HIGH | COHERENCE VALUE LARGE | COHERENCE VALUE MEDIUM |
| | LOW | COHERENCE VALUE SMALL | COHERENCE VALUE MINUTE |

FIG. 2
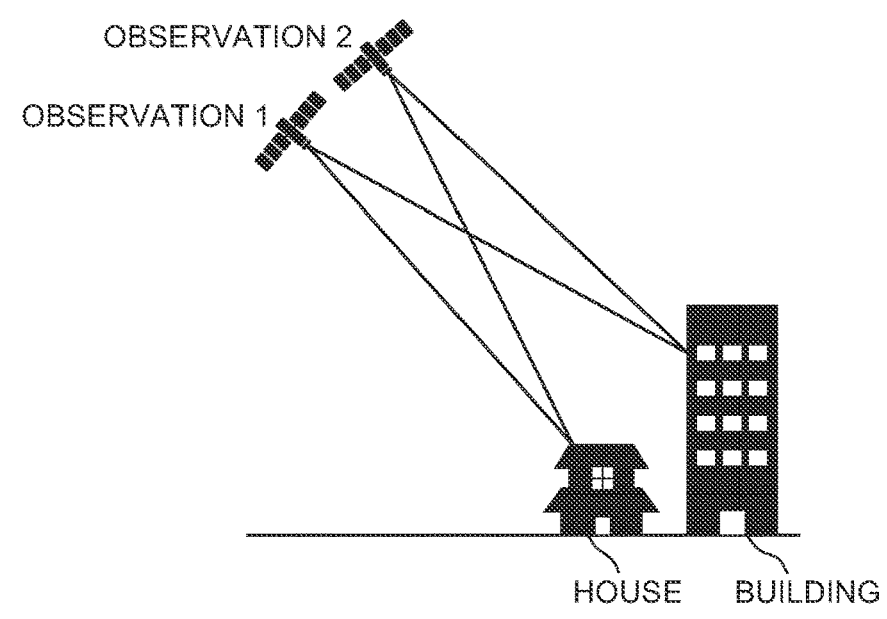
OBSERVATION 2
OBSERVATION 1
HOUSE    BUILDING
FIG. 3
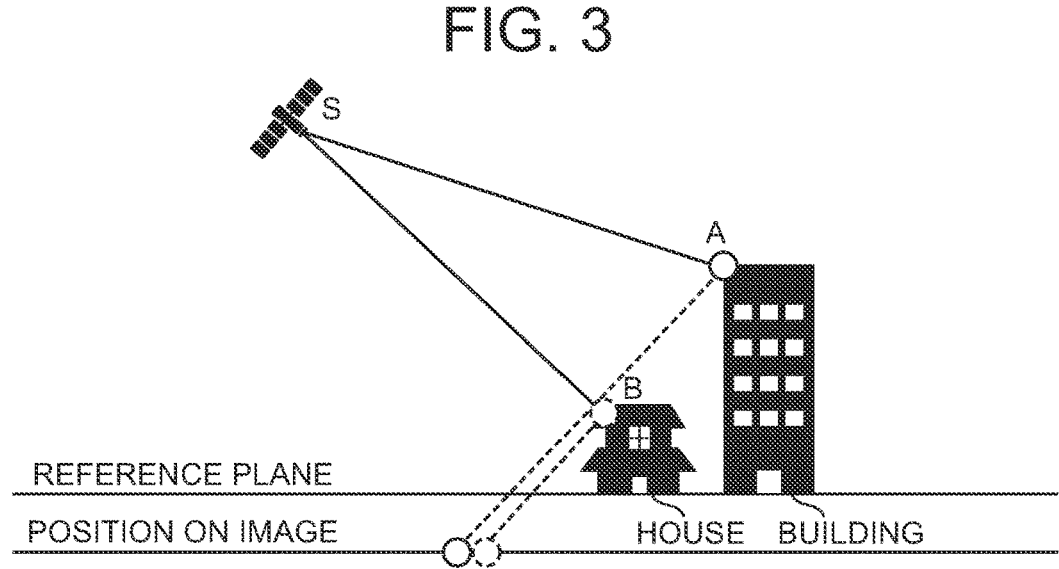
S
A
B
REFERENCE PLANE
POSITION ON IMAGE
HOUSE    BUILDING
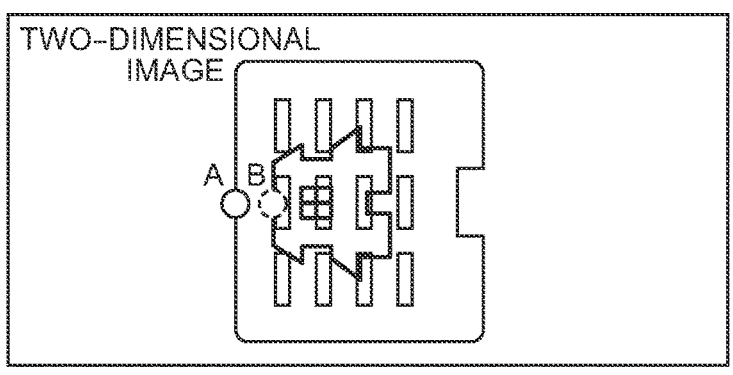
TWO-DIMENSIONAL
IMAGE
A  B (REFERENCE EXAMPLE)

(CHANGE DETECTION PROCESS: REFERENCE EXAMPLE)

START

RECONSTRUCT 3D INFORMATION OF PREDETERMINED AREA FROM GROUP OF EXISTING SAR IMAGES — S901

ESTIMATE PHASE SIGNAL REGARDING SAR IMAGE PAIR — S902

ELIMINATE PHASE SIGNAL REGARDING SAR IMAGE PAIR — S903

PERFORM CHANGE DETECTION PROCESS — S904

END (FIRST ASPECT OF FIRST EXAMPLE EMBODIMENT)

(SECOND ASPECT OF FIRST EXAMPLE EMBODIMENT)

FIG. 11

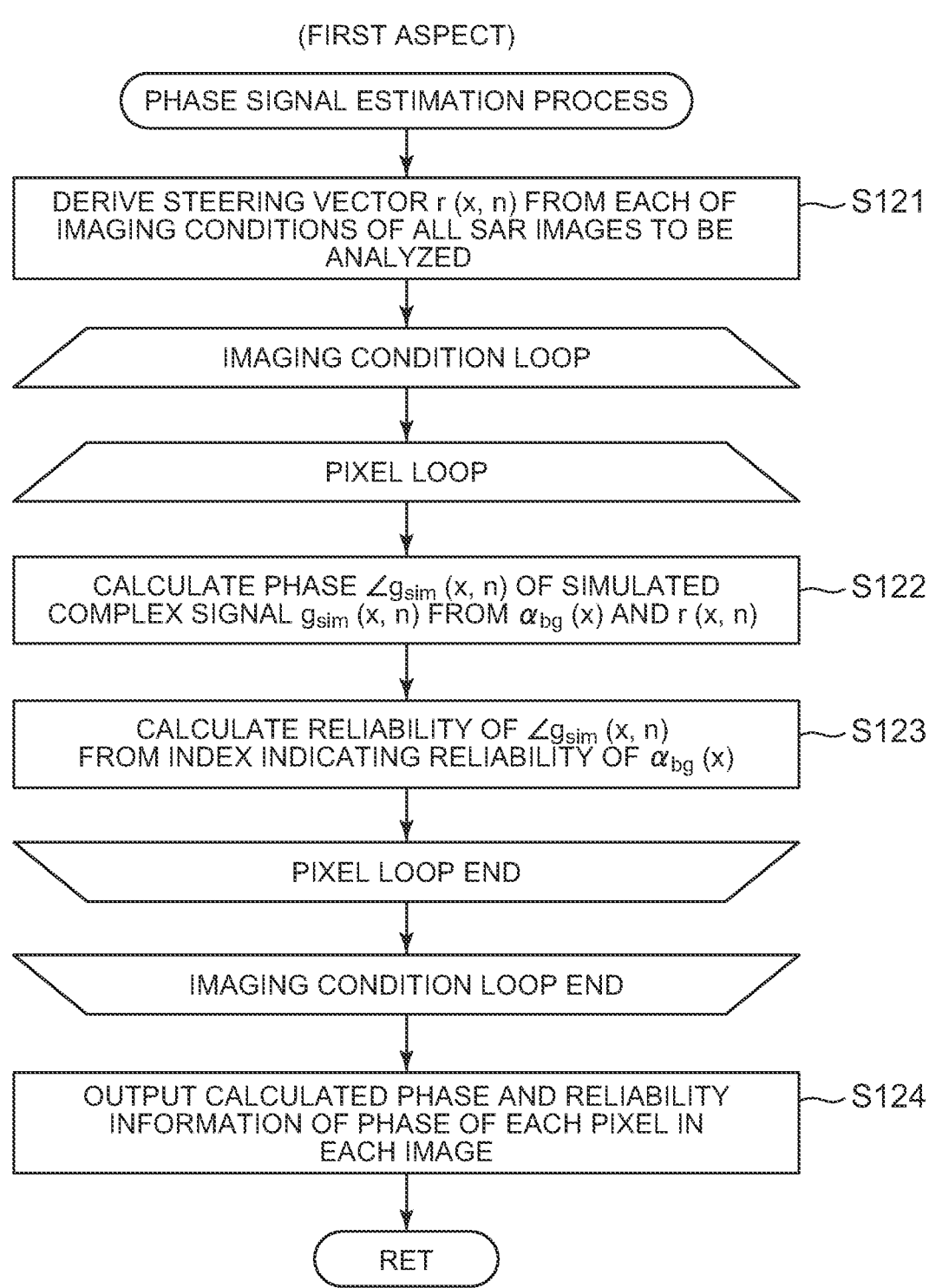

(FIRST ASPECT)

PHASE SIGNAL ESTIMATION PROCESS

DERIVE STEERING VECTOR r (x, n) FROM EACH OF IMAGING CONDITIONS OF ALL SAR IMAGES TO BE ANALYZED — S121

IMAGING CONDITION LOOP

PIXEL LOOP

CALCULATE PHASE $\angle g_{sim}$ (x, n) OF SIMULATED COMPLEX SIGNAL $g_{sim}$ (x, n) FROM $\alpha_{bg}$ (x) AND r (x, n) — S122

CALCULATE RELIABILITY OF $\angle g_{sim}$ (x, n) FROM INDEX INDICATING RELIABILITY OF $\alpha_{bg}$ (x) — S123

PIXEL LOOP END

IMAGING CONDITION LOOP END

OUTPUT CALCULATED PHASE AND RELIABILITY INFORMATION OF PHASE OF EACH PIXEL IN EACH IMAGE — S124

RET

FIG. 12

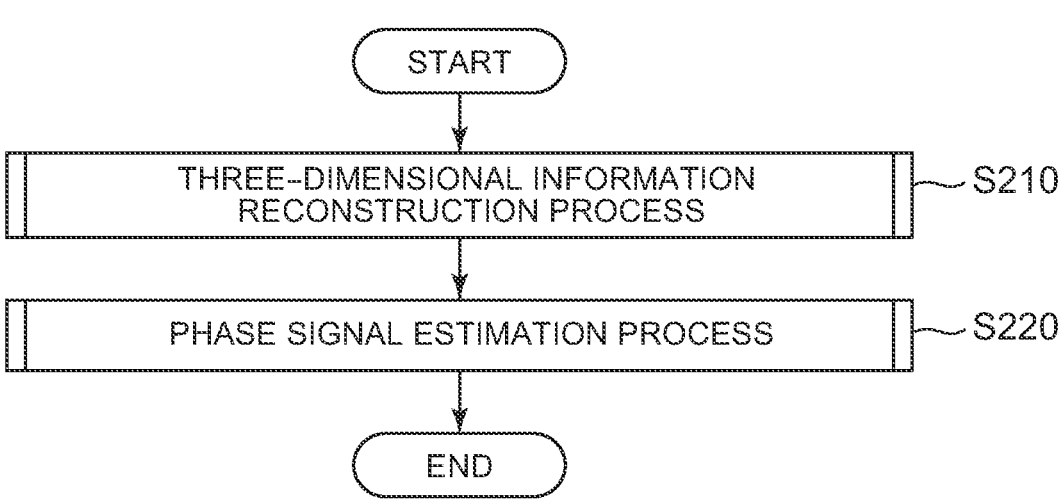

START

THREE-DIMENSIONAL INFORMATION RECONSTRUCTION PROCESS ~ S210

PHASE SIGNAL ESTIMATION PROCESS ~ S220

END

FIG. 13

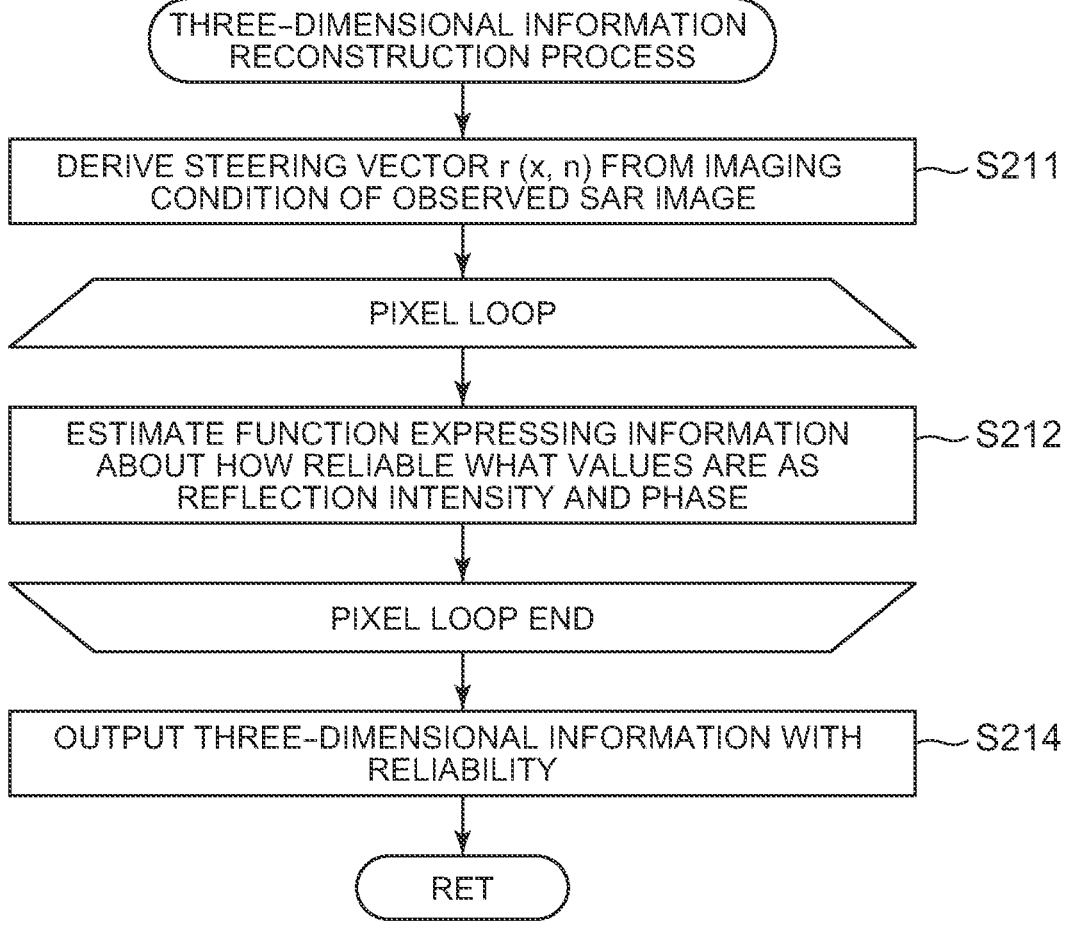

THREE-DIMENSIONAL INFORMATION RECONSTRUCTION PROCESS

DERIVE STEERING VECTOR r (x, n) FROM IMAGING CONDITION OF OBSERVED SAR IMAGE ~ S211

PIXEL LOOP

ESTIMATE FUNCTION EXPRESSING INFORMATION ABOUT HOW RELIABLE WHAT VALUES ARE AS REFLECTION INTENSITY AND PHASE ~ S212

PIXEL LOOP END

OUTPUT THREE-DIMENSIONAL INFORMATION WITH RELIABILITY ~ S214

RET

FIG. 14

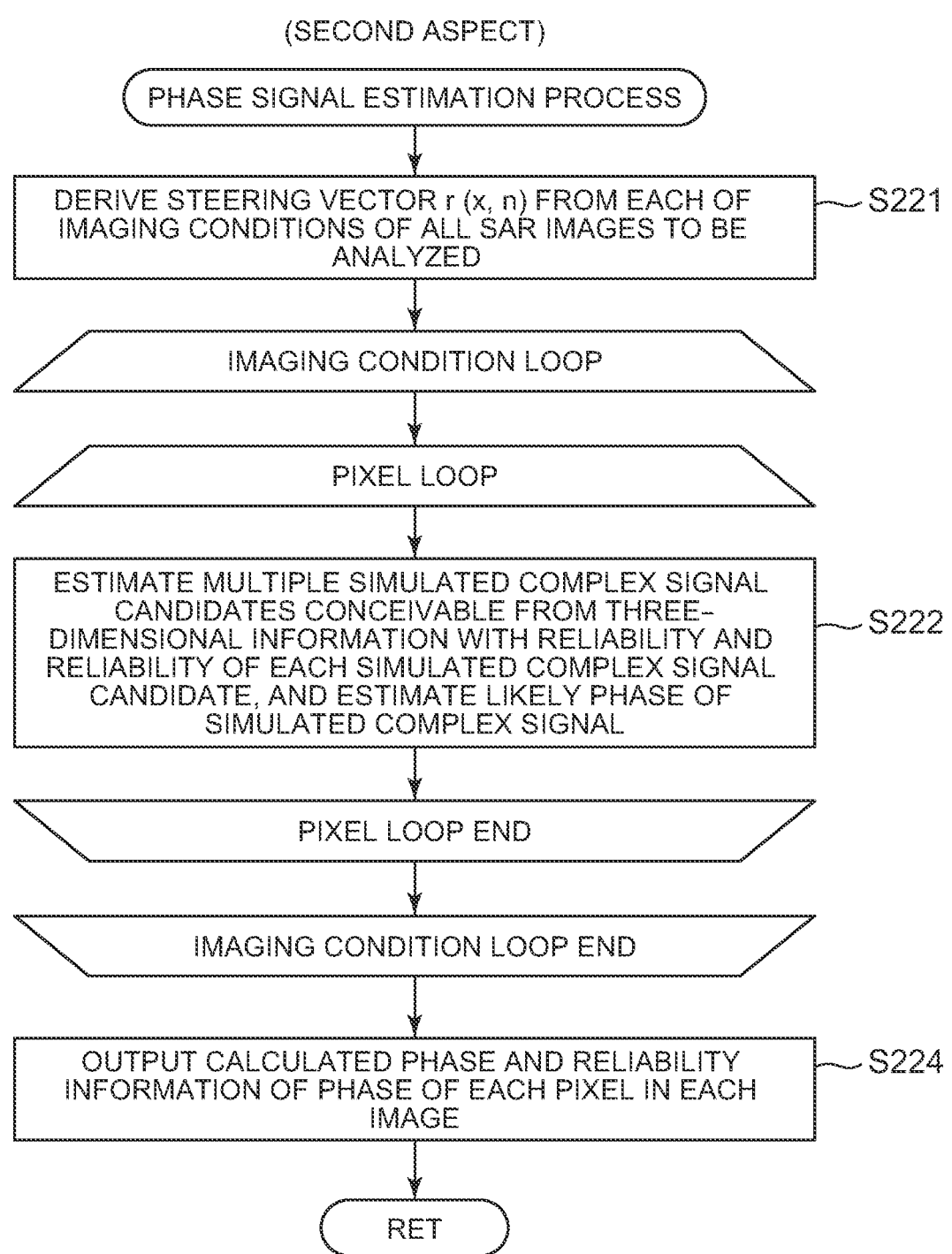

(SECOND ASPECT)

PHASE SIGNAL ESTIMATION PROCESS

DERIVE STEERING VECTOR r (x, n) FROM EACH OF IMAGING CONDITIONS OF ALL SAR IMAGES TO BE ANALYZED ~S221

IMAGING CONDITION LOOP

PIXEL LOOP

ESTIMATE MULTIPLE SIMULATED COMPLEX SIGNAL CANDIDATES CONCEIVABLE FROM THREE-DIMENSIONAL INFORMATION WITH RELIABILITY AND RELIABILITY OF EACH SIMULATED COMPLEX SIGNAL CANDIDATE, AND ESTIMATE LIKELY PHASE OF SIMULATED COMPLEX SIGNAL ~S222

PIXEL LOOP END

IMAGING CONDITION LOOP END

OUTPUT CALCULATED PHASE AND RELIABILITY INFORMATION OF PHASE OF EACH PIXEL IN EACH IMAGE ~S224

RET (SECOND EXAMPLE EMBODIMENT)

(THIRD EXAMPLE EMBODIMENT)

CHANGE DETECTION RESULT (FOURTH EXAMPLE EMBODIMENT)

CHANGE DETECTION RESULT (FIFTH EXAMPLE EMBODIMENT)

(SIXTH EXAMPLE EMBODIMENT)

(SEVENTH EXAMPLE EMBODIMENT)

CHANGE DETECTION RESULT

SIGNAL PROCESSING DEVICE AND SIGNAL PROCESSING METHOD

CROSS-REFERENCE TO RELATED APPLICATION

This application is based upon and claims the benefit of priority from the prior Japanese Patent Application No. 2022-138922, filed on Sep. 1, 2022, the entire contents of which are incorporated herein by reference.

BACKGROUND OF THE INVENTION

Field of the Invention

This invention relates to a signal processing device and a signal processing method using SAR images.

Description of the Related Art

Synthetic aperture radar (SAR) technology is a technology which can acquire an image (hereinafter referred to as a SAR image) equivalent to the image by an antenna having a large aperture, when a radar mounted on a flying object such as an artificial satellite, an aircraft, or the like transmits and receives a radio wave while the flying object moves. The synthetic aperture radar is utilized, for example, for analyzing a ground surface deformation by signal processing reflected waves from the ground surface, etc.

An image taken by a flying object such as a satellite is called an observation image. In this specification, an observation image corresponds to a SAR image. Hereinafter, a flying object that transmits and receives electromagnetic waves is assumed to be a satellite, but a flying object is not limited to a satellite.

For example, a signal processing device using a change detection technique using coherence (Coherent Change Detection) is described in patent literature 1. The coherence is calculated by complex correlation of pixels at the same position in multiple SAR images among K (K≥2) SAR images. Suppose that (p, q) is a pair of SAR images and $c_{p, q}$ are components of the coherence matrix. Respective p and q are less than or equal to K and indicate one of the K SAR images. The phase $\theta_{p, q}$ (specifically, the phase difference) is calculated for each pair of SAR images. Then, an absolute value of the value acquired by averaging $\exp(-j\theta_{p, q})$ for a plurality of pixels in a predetermined area including pixels for coherence calculation is the component $c_{p, q}$ of the coherence matrix. $A_p \cdot A_q \cdot \exp(-j\theta_{p, q})$ may be averaged, where intensity in SAR image p is as $A_p$ and intensity in SAR image q is as $A_q$.

The values represented by components of a coherence matrix are coherence values. A coherence image in which the coherence values are pixel values is supposed.

A signal processing device that uses a change detection technique that utilizes coherence performs change detection based on a coherence image. The signal processing device determines that a change has occurred when it detects an area with a low coherence value in the coherence image. For example, the signal processing device generates a coherence image from a SAR image that has already been acquired and a new SAR image targeting the same area of observation as when the SAR image was acquired. As an example, a change occurs in an area when a new structure appears or an existing structure disappears.

Hereinafter, SAR images that have already been acquired are referred to as stored SAR images. Newly acquired SAR images are sometimes referred to as SAR images to be analyzed. A group of SAR images consists of multiple SAR images that have already been acquired.

[Patent Literature 1] European Patent Application Publication No. 3540462

[Patent Literature 2] Japanese Patent Application Publication No. 2008-185375

[Patent Literature 3] International Publication No. 2008/016153

SUMMARY OF THE INVENTION

SAR images can be affected by layover. For example, in an urban area where structures exist in the observed area, reflected waves from tall structures, low structures and the ground surface are mixed in the radar mounted on a satellite. As a result, the received waveform of the radar mounted on the satellite becomes unstable. Specifically, in a SAR image, layover of overlaying information of tall structures on information of low structures may occur. In a situation where layover occurs, changes may occur among multiple SAR images even if no changes actually occur in the observed area.

When a change occurs between multiple SAR images, the coherence value decreases in the coherence image because the similarity between the SAR images decreases. In such a case, the sensitivity of change detection using coherence is reduced. For example, even if there is no actual change in the observed area, it may be misidentified as a change.

For reducing influence of layover on SAR images, there is a technique that uses the three-dimensional information of the observed area estimated from SAR images (for example, refer to patent literature 2). The device described in patent literature 2 inputs multiple SAR images. The device converts the difference in distortion between the multiple SAR images into a height. Further, the device generates three-dimensional shape data (three-dimensional information) of the observed area using the height information.

It is assumed that the technology that uses the three-dimensional information estimated from multiple SAR images is applied to a signal processing device that uses a change detection technology. The signal processing device to which this technology is applied will be referred to as the applicable device.

The applicable device generates three-dimensional information to reduce influence of layover from the multiple SAR images before the change (before the change occurs in the observed area). The applicable device also generates three-dimensional information to reduce influence of layover from the multiple newly acquired SAR images. Then, the applicable device performs change detection by referring to both three-dimensional information.

To perform the change detection described above, multiple SAR images are needed multiple newly acquired SAR images after the change, as well as multiple SAR images before the change. In other words, a large number of SAR images are needed to reduce influence of layover. In addition, the applicable device performs processing to generate three-dimensional information using multiple SAR images before the change and processing to generate three-dimensional information using multiple newly acquired SAR images after the change. Therefore, many image acquisitions are required to reconstruct the three-dimensional information before and after the change. Accordingly, image acquisition requires great care and time.

Patent literatures 1-3 do not describe a techniques for detecting change from the steady state in the SAR image to be analyzed using a complex correlation coefficient. The steady state is represented, for example, by a given complex image. The imaging condition of the complex image showing the steady state is consistent with the imaging condition of the SAR image to be analyzed. For example, the disaster countermeasure support method described in patent literature 3 uses only intensity of reflected waves. Accordingly, each of the techniques described in patent literatures 1-3 cannot correctly detect change from the steady state.

In this specification, "steady state" refers to a state in which there is no change in the object of observation, or even if there is change in the object of observation, the degree of the change is negligible.

For example, when change detection is based on SAR images, it is preferable to use complex images showing a steady state, but it is difficult to generate complex images showing a steady state in the observed area where influence of layover is large. For example, an observed area with large layover influence is a forested area with tall man-made structures, such as an urban area.

It is an object of the present invention to provide a signal processing device and a signal processing method that can perform robust change detection with reduced influence of layover without reproducing a three-dimensional information after the change.

A preferred aspect of the signal processing device includes three-dimensional information with reliability reconstruction means for generating three-dimensional information with reliability including three-dimensional information involving intensity and an estimated value of a phase at a three-dimensional position reconstructed using observed SAR images and imaging conditions, and information indicating reliability of the three-dimensional information, and phase signal estimation means for calculating phase signals for all pixels in an analyzed area for all imaging conditions of SAR images to be analyzed, and calculating the information indicating reliability of the phase signals based on the information indicating reliability of the three-dimensional information.

A preferred aspect of the signal processing method includes generating three-dimensional information with reliability including three-dimensional information involving intensity and an estimated value of a phase at a three-dimensional position reconstructed using observed SAR images and imaging conditions, and information indicating reliability of the three-dimensional information, and calculating phase signals for all pixels in an analyzed area for all imaging conditions of SAR images to be analyzed, and calculating the information indicating reliability of the phase signals based on the information indicating reliability of the three-dimensional information.

A preferred aspect of the signal processing program causes a computer to execute a process of generating three-dimensional information with reliability including three-dimensional information involving intensity and an estimated value of a phase at a three-dimensional position reconstructed using observed SAR images and imaging conditions, and information indicating reliability of the three-dimensional information, and a process of calculating phase signals for all pixels in an analyzed area for all imaging conditions of SAR images to be analyzed, and calculating the information indicating reliability of the phase signals based on the information indicating reliability of the three-dimensional information.

According to the present invention, robust change detection can be performed with reduced influence of layover without reproducing a three-dimensional information after the change.

BRIEF DESCRIPTION OF THE DRAWINGS

FIG. 1 It depicts an explanatory diagram showing a relationship between the coherence value, and intensity correlation and phase correlation between SAR images.

FIG. 2 It depicts an explanatory diagram showing an example of a SAR satellite imaging a structure.

FIG. 3 It depicts an explanatory diagram showing an example of layover phenomenon that occurs in a SAR image.

FIG. 11 It depicts a flowchart showing the phase signal estimation process in the first aspect of the first example embodiment.

FIG. 12 It depicts a flowchart showing the signal processing performed by the signal processing device of the second aspect of the first example embodiment.

FIG. 13 It depicts a flowchart showing the three-dimensional information reconstruction process in the second aspect of the first example embodiment.

FIG. 14 It depicts a flowchart showing the phase signal estimation process in the second aspect of the first example embodiment.

DESCRIPTION OF THE PREFERRED EMBODIMENTS

Figure 4:
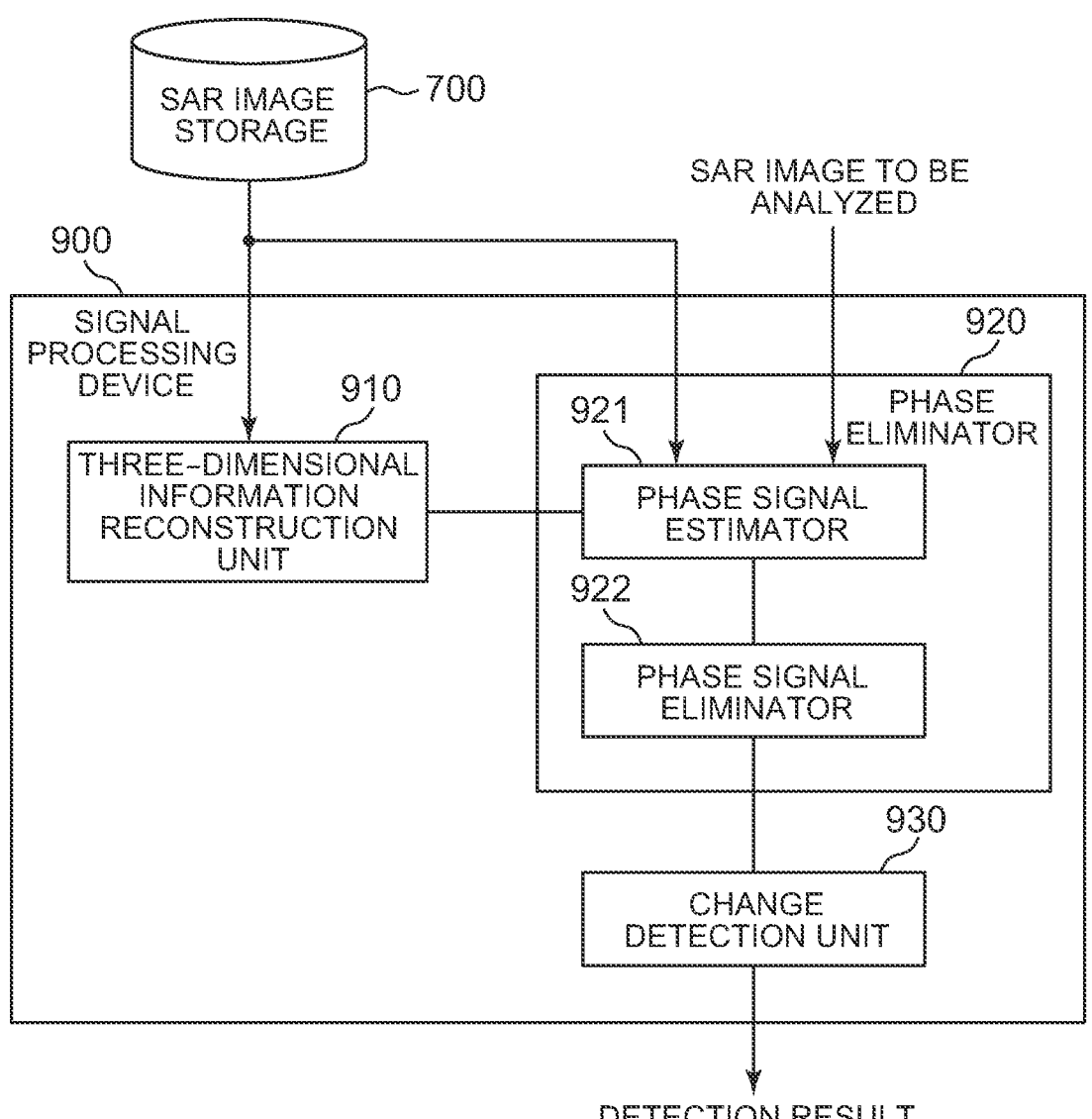
FIG. 4 It depicts a block diagram showing a configuration example of the signal processing device in a reference example.

In image analysis, background subtraction detection and anomaly detection techniques are known. They are used, for example, to detect objects other than permanently existing objects such as structures. They are also used to detect a condition on the ground such as new construction or collapse of structures. Objects other than permanently existing objects include a vehicle and an aircraft, for example. However, a vehicle and an aircraft can also be considered permanently existing objects if they are present over the monitoring period.

The above technique detects changes in the image to be analyzed relative to image data indicating a steady state. Image data indicating a steady state is selected from image data acquired and stored in the past. The image data indicating a steady state may be generated from stored image data.

A SAR image is a complex image that has information on the intensity of the irradiated microwaves and phase information for each pixel. One of change detection techniques for a complex image is the coherent change detection technique described above.

The coherent change detection technique detects minute change from a steady state based on the value of the complex correlation coefficient (coherence) which indicates the degree of similarity between images. The coherence which is the complex correlation coefficient between SAR images is one indicator of intensity correlation and phase correlation in the local area between SAR images. Since the change detection technique using coherence uses phase information in addition to intensity, it can increase the sensitivity of change detection.

FIG. 1 is an explanatory diagram showing a relationship between the coherence value, and intensity correlation and phase correlation between SAR images. As shown in FIG. 1, the larger the coherence value, the greater the similarity in intensity between SAR images and the greater the similarity in phase between SAR images. In other words, the larger the coherence value, the less change there is between SAR images.

As shown in FIG. 1, the smaller the coherence value, the lower at least one of intensity similarity between SAR images and similarity in phase between SAR images. In other words, the smaller the coherence value, the more change there is between SAR images.

In addition, the coherence value is an indicator that is more sensitive to phase change than to change in intensity of the reflected wave. As shown in FIG. 1, the coherence value is lower when the phase similarity is lower than the intensity similarity. The coherent change detection technique can also capture the switching of reflectors.

One problem is to generate a complex image representing a steady state suitable for SAR image analysis.

SAR images observed by a SAR satellite orbiting the earth have different imaging conditions for each observation. The imaging conditions include the position of the SAR satellite at the time of observation, the coordinates of an area to be analyzed (analyzed area), the resolution, etc. Therefore, even when an area under the steady state is observed, differences occur between SAR images acquired for each observation. In particular, when an area with structures of different heights, such as an urban area, is observed, the phase information changes significantly from observation to observation. In such a situation, if a complex image with consistent imaging condition (a complex image representing a steady state) cannot be generated, change in the image due to a difference in an imaging condition is taken as change that occurred in the area to be analyzed. Namely, change in the image due to a difference in an imaging condition is a factor in false detection. It should be noted that a SAR satellite is a satellite on which a SAR is mounted.

There is a height of a structure as one reason why different imaging conditions result in different observed SAR images, even when the target of observation is observed under the steady state. FIG. 2 is an explanatory diagram showing an example of a SAR satellite imaging a structure.

The imaging conditions for observation 1 and observation 2 shown in FIG. 2 are different. As a result, an amount of phase change due to the height of the structure by observation 1 is different from an amount of phase change due to the height of the structure by observation 2. Therefore, in this case, phases of the observed SAR image are different even when the target of the observation is observed under the steady state.

There is intensity of overlapping structures. as another reason why different imaging conditions result in different observed SAR images, even when the target of observation is observed under the steady state. FIG. 3 is an explanatory diagram showing an example of layover phenomenon that occurs in a SAR image.

As shown in FIG. 3, when distance SA<distance SB, the position A of the building and the position B of the house are reversed on the image. The reversal of positions is the layover phenomenon.

When a SAR satellite takes an image of an area that includes a building and a house under the condition that causes a layover phenomenon, a two-dimensional image (SAR image) in which the building and the house overlap is taken as illustrated in FIG. 3. The area where the building and house overlap in the two-dimensional image illustrated in FIG. 3 is a layover area where signals received from multiple reflectors overlap each other. Since the information of multiple structures overlaps, it is difficult to extract the information of individual structures from the layover area.

In addition, in the layover area, the phase of the SAR image acquired for each observation also depends on the intensity of the overlapping structures. Since different imaging conditions result in different overlapping structures, the phases of the observed SAR images are different even if there is no change in the steady state of the target of the observation.

Due to the above two causes, SAR images acquired in different observations are different even when the SAR satellite observes an area under the steady state. In other words, the intensity and phase of the pixel in the SAR image that constitute a permanently existing object, such as a structure, depends on the condition under which the SAR image was taken.

Due to the fact that each of SAR images of the steady state area acquired for each observation is different from each other, it is difficult to estimate a complex image representing the steady state consistent with the imaging condition of the SAR image to be analyzed.

When a complex image with consistent the imaging condition (a complex image representing the steady state) cannot be estimated, it is difficult to detect change in the SAR image to be analyzed from the complex image using the coherent change detection technique that uses phase information. In particular, in areas where tall man-made structures are forested such as in an urban area, the layover phenomenon peculiar to SAR images is likely to occur. This makes it more difficult to estimate a complex image that represents the steady state consistent with the imaging condition.

As a method to acquire correlation using phase information other than a coherence value, for example, there is a method to extract phase information from SAR images as real number values and acquire correlation using the extracted real number values.

Next, a reference example corresponding to the premise of the present invention will be explained. FIG. 4 is a block diagram showing a configuration example of the signal processing device as a reference example. The signal processing device 900 shown in FIG. 4 comprises a three-dimensional information reconstruction unit 910, a phase eliminator 920, and a change detection unit 930.

The three-dimensional information reconstruction unit 910 reconstructs three-dimensional information of the observed area from multiple SAR images stored in the SAR image storage 700 using a SAR tomography technique, for example. The multiple SAR images stored in the SAR image storage 700 include SAR images that observe the steady state.

The phase eliminator 920 includes a phase signal estimator 921 and a phase signal eliminator 922. The phase signal estimator 921 estimates a phase signal in the observed area from the SAR image pair. The phase eliminator 920 eliminates phase signals in the observed area.

As described above, layover may occur when, for example, tall structures are present in the observed area. Received signals from the observed area are a mixture of signals originating from various reflectors. Therefore, even if no changes occur on the ground surface, the similarity of received signals between SAR images decreases and coherence is reduced. In this example embodiment, the phase eliminator 920 refers to the three-dimensional information of the observed area and eliminates phase signals caused by the height (height of the structure) that causes the layover. For example, the phase eliminator 920 uses three-dimensional point cloud data with information on intensity and phase reproduced by SAR tomography to simulate signal mixing in the observed area. In other words, the phase eliminator 120 reproduces phases that are not related to changes in the ground surface (i.e., phases caused by the height of structures). The phase eliminator 920 then eliminates signals with such phases from the observed signals In addition, a phase signal due to height is considered to be highly variable among multiple SAR images. Therefore, elimination of a phase signal due to height reduces the change between multiple SAR images when no change actually occurs. As a result, more accurate coherent change detection can be performed even in the layover area.

The change detection unit 930 generates a coherence image from one of the SAR images stored in the SAR image storage 700 and the SAR image to be analyzed. The change detection unit 930 uses the coherence image to determine whether a change has occurred in the observed area. The SAR image to be analyzed may be a newly acquired SAR image or a SAR image selected from multiple SAR images stored in the SAR image storage 700.

Figure 5:
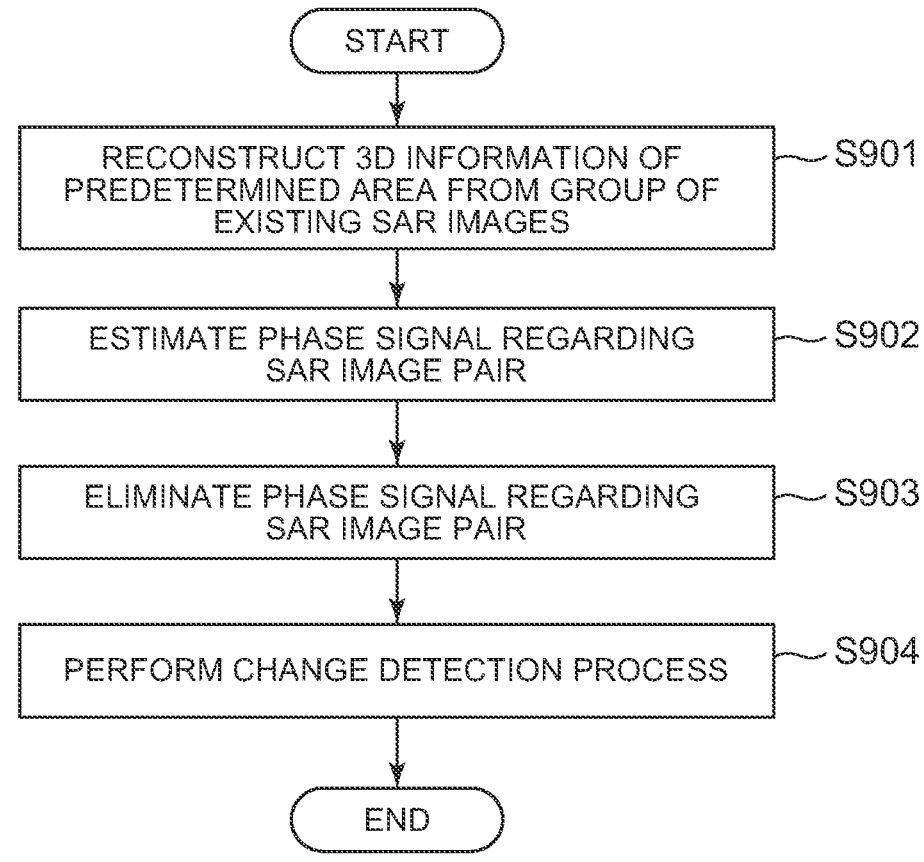
FIG. 5 It depicts a flowchart showing an example of an operation of the signal processing device in the reference example embodiment.

Next, the overall operation of the change detection device 100 of the reference example will be explained with reference to the flowchart of FIG. 5.

The three-dimensional information reconstruction unit 910 reads a group of existing SAR images from the SAR image storage 700. Then, the three-dimensional information reconstruction unit 910 reconstructs the three-dimensional information of the observed area using a SAR tomography technique (step S901).

In the phase eliminator 920, the phase signal estimator 921 reads one SAR image from the SAR image storage 700. The phase signal estimator 921 also inputs the SAR image to be analyzed. The phase signal estimator 921 estimates a phase signal of the SAR image pair of the SAR image read from the SAR image storage 700 and the SAR image to be analyzed in the observed area, utilizing the three-dimensional information (step S902).

The phase signal eliminator 922 eliminates the phase signal of the SAR image pair estimated by the phase signal estimator 921 (step S903).

The change detection unit 930 calculates a coherence value between the SAR images in the SAR image pair. The change detection unit 930 generates a coherence image with the coherence values as pixel values. The change detection unit 930 performs the change detection process (step S904). That is, the change detection unit 930 determines whether or not there is an area in the observed area where a change has occurred.

Specifically, the coherent detection unit 930 calculates coherence values between the SAR images of the SAR image pairs from the phase eliminator 920. In other words, the change detection unit 930 generates a coherence image with the coherence values as pixel values. The change detection unit 930 determines whether there is a portion in the observed area where the coherence value is smaller than, for example, a predetermined threshold value. When such a portion exists, the change detection unit 930 determines that a change has occurred in the observed area.

For example, the change detection unit 930 determines that a change has occurred in the observed area when the values (coherence values) of all pixels in an area (portion) of a predetermined size in the coherence image are smaller than a predetermined threshold value. The change detection unit 930 may determine that a change has occurred in the observed area when there are more than a predetermined percentage of pixels, whose coherence values are smaller than a predetermined threshold value, in an area of a predetermined size.

As described above, the three-dimensional information reconstruction unit 910 reconstructs the three-dimensional information of the observed area in a three-dimensional information reconstruction process using a SAR tomography technique.

SAR tomography is a technique that uses multiple observed SAR images to estimate a complex reflectivity distribution in the elevation direction for each pixel. The elevation direction can be defined, for example, as the direction perpendicular to the azimuth-range plane (a plane formed by the travel direction of the SAR satellite and the sight direction).

In other words, the three-dimensional information is information of each point in a three-dimensional space with azimuth, range, and elevation directions. Each point has information on intensity (estimated value of intensity) and a phase (estimated value of phase).

An example of a method estimating a complex reflectivity distribution at a pixel corresponding to the azimuth-range position $(x^{\rightarrow})$ will be explained referring to FIG. 6.

The symbol "$\rightarrow$" which is used in the text should originally appear directly above the immediately preceding character, but due to limitations in notation, it appears immediately after the character.

Figure 6:
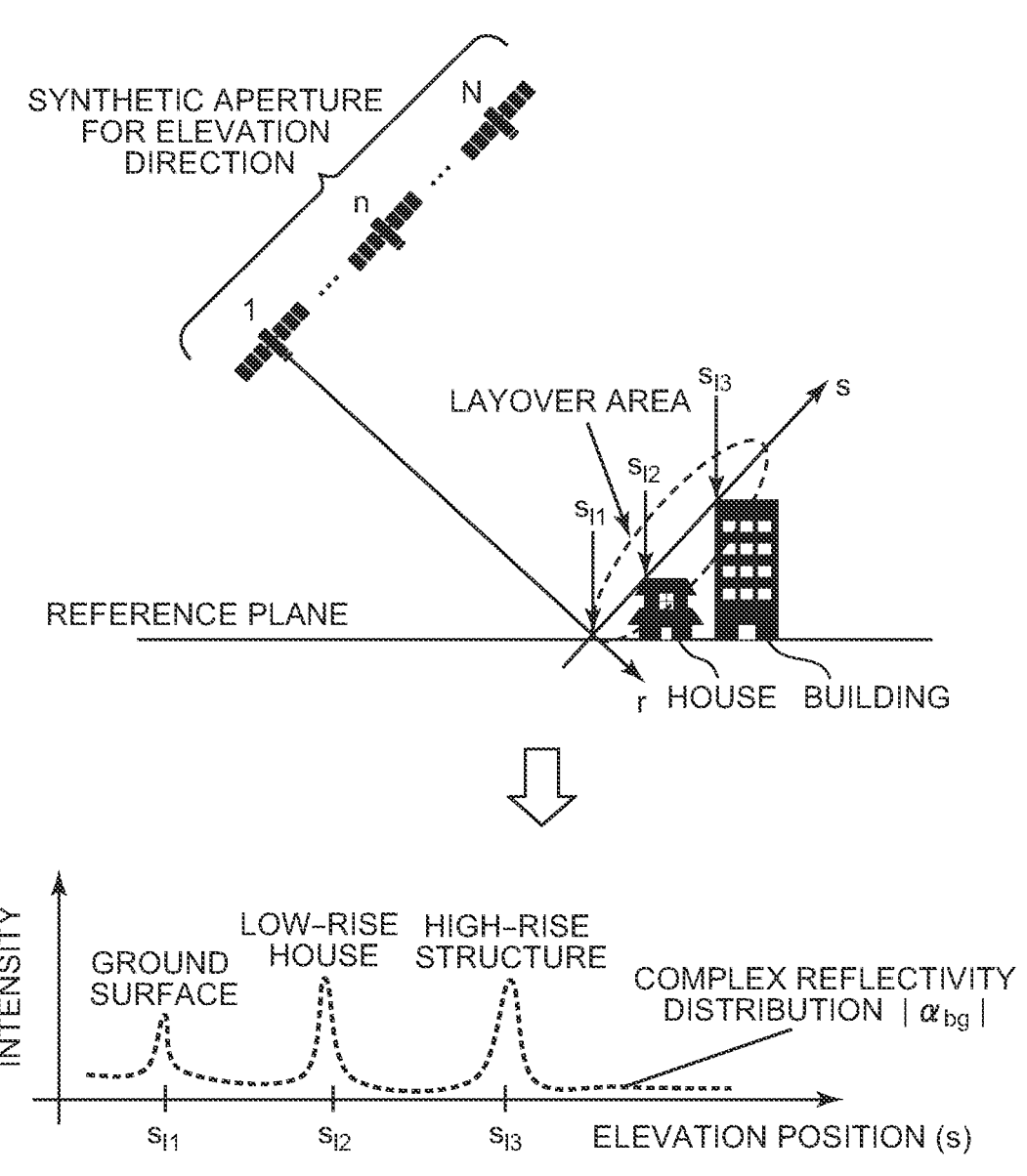
FIG. 6 It depicts an explanatory diagram for explaining SAR tomography.

The plane perpendicular to the elevation direction s in FIG. 6 represents the azimuth-range plane. The azimuth-range position $(x^{\rightarrow})$ is the intersection of the axis indicating the elevation direction and the axis indicating the sight direction of the satellite in FIG. 6.

The three-dimensional information reconstruction unit 910 estimates a complex reflectivity distribution for each pixel, which indicates a height of a structure, intensity, and a phase that exists permanently over the observation period, based on the multiple observed SAR images.

When SAR tomography is used in the three-dimensional information reconstruction unit 910, a three-dimensional complex reflectivity distribution is generated by combining the complex reflectivity acquired for each pixel for all pixels in the area to be analyzed.

In order to reconstruct the three-dimensional steady state using SAR tomography or other methods, multiple observed SAR images taken from slightly different orbits are used. Therefore, multiple observation SAR images are input to the three-dimensional information reconstruction unit 910.

The upper row in FIG. 6 shows the SAR satellite observations from the first to the Nth observation. N indicates the total number of observations. N is an integer greater than 1.

The first to Nth observations shown in FIG. 6 correspond to a synthetic aperture for the elevation direction. In nth ($1 \le n \le N$) observation, a relationship expression between a received signal (a complex signal) recorded in the pixel corresponding to the azimuth-range position $(x^{\rightarrow})$ and a complex reflectivity distribution at the pixel is expressed by the following equation (1), for example.

$$g_{obs}(x,n) = r(x,n) \cdot \alpha(x,n) \tag{1}$$

$g_{obs}(x^{\rightarrow}, n)$ in equation (1) represents a received signal (a complex signal) recorded in the pixel corresponding to the complex signal) recorded in the pixel corresponding to the azimuth-range position $(x^{\rightarrow})$. $r^{\rightarrow}(x^{\rightarrow}, n)$ in equation (1)

represents the steering vector at the pixel corresponding to the azimuth-range position $(x^{\rightarrow})$. $\alpha^{\rightarrow}(x^{\rightarrow}, n)$ in equation (1) represents a complex reflectivity distribution at the pixel corresponding to the azimuth-range position $(x^{\rightarrow})$.

The steering vector is acquired from the imaging condition. For example, the steering vector $r^{\rightarrow}(x^{\rightarrow}, n)$ is expressed by the following equation (2).

$$r(x,n) = [\exp(-4j\pi k_n s_1), \ldots, \exp(-4j\pi k_n s_L)] \in \mathbb{C}^{1 \times L} \tag{2}$$

$k_n$ in equation (2) represents a phase-to-elevation conversion coefficient (a coefficient that converts between phase and elevation). $S_l$ ($l = 1, \ldots, L$) in equation (2) represents a position in the elevation direction. The steering vector may be expressed by an equation other than equation (2). For example, a steering vector that takes into account influence of temperature and displacement may be used. j in equation (2) represents an imaginary unit. $\pi$ in equation (2) represents the circle ratio. Exp represents the exponential function whose base is the Napier's constant. C represents a complex number.

The relationship expression as equation (2) is defined for every first to Nth observation. The three-dimensional information reconstruction unit 910 solves the optimization problem using multiple observation data (received signals) and steering vectors to acquire a complex reflectivity distribution $\alpha_{bg}^{\rightarrow}(x^{\rightarrow})$ of the permanently existing structure.

Specifically, the three-dimensional information reconstruction unit 910 acquires a complex reflectivity distribution $\alpha_{bg}^{\rightarrow}(x^{\rightarrow})$ of a structure by determining a complex reflectivity distribution so that N times observation data obtained when the area containing the structure, etc. are taken and the N times steering vectors are congruent.

The bottom row in FIG. 6 shows an example of the absolute value $|\alpha_{bg}|$ of the complex reflectivity distribution $\alpha_{bg}^{\rightarrow}(x^{\rightarrow})$ of the permanently existing structure at the pixel corresponding to the azimuth-range position $(x^{\rightarrow})$ acquired by the three-dimensional information reconstruction unit 910. The absolute value $|\alpha_{bg}|$ corresponds to the intensity on the vertical axis shown in the bottom row of FIG. 6. The horizontal axis shown in the bottom row of FIG. 6 shows the elevation position.

The complex reflectivity distribution $\alpha_{bg}^{\rightarrow}(x^{\rightarrow})$ shown in FIG. 6 presents large values at elevation positions of $s_{l1}$ (ground), $s_{l2}$ (house), and $s_{l3}$ (building). The received signal at position $x^{\rightarrow}$ is the overlapping signal of the complex reflectivities at elevation positions of $s_{l1}$, $S_{l2}$ and $s_{l3}$. More precisely, the received signal at position $x^{\rightarrow}$ corresponds to the result of the Fourier transform of the complex reflectivity distribution in the elevation direction.

When the three-dimensional information reconstruction unit 910 uses SAR tomography, the three-dimensional information reconstruction unit 910 generates a three-dimensional complex reflectivity distribution by combining the complex reflectivity distribution for each pixel for all pixels in the area to be analyzed. Then, the three-dimensional information reconstruction unit 910 outputs the three-dimensional complex reflectivity distribution as three-dimensional information. Instead of generating a three-dimensional complex reflectivity distribution, the three-dimensional information reconstruction unit 910 may generate three-dimensional point cloud data which is a set of points with information on the position of a reflector, intensity, and a phase.

An example of the intensity distribution is shown in the bottom row in FIG. 6. In the example shown in FIG. 6, the intensity of reflected waves from a low-rise house is greater than the intensity of reflected waves from the ground surface (ground). Compared to the intensity of the reflected waves from the ground surface, the intensity of the reflected waves from a high-rise structure is greater. In the above reference example, the three-dimensional information reconstruction unit 910 uses SAR tomography as means of calculating three-dimensional information. However, the three-dimensional information reconstruction unit 910 may use other means which can reproduce intensity and a phase than SAR tomography as means of calculating three-dimensional information.

Hereinafter, example embodiments of the present invention will be explained with reference to the drawings.

Example Embodiment 1

First Aspect of the First Example Embodiment

Figure 7:
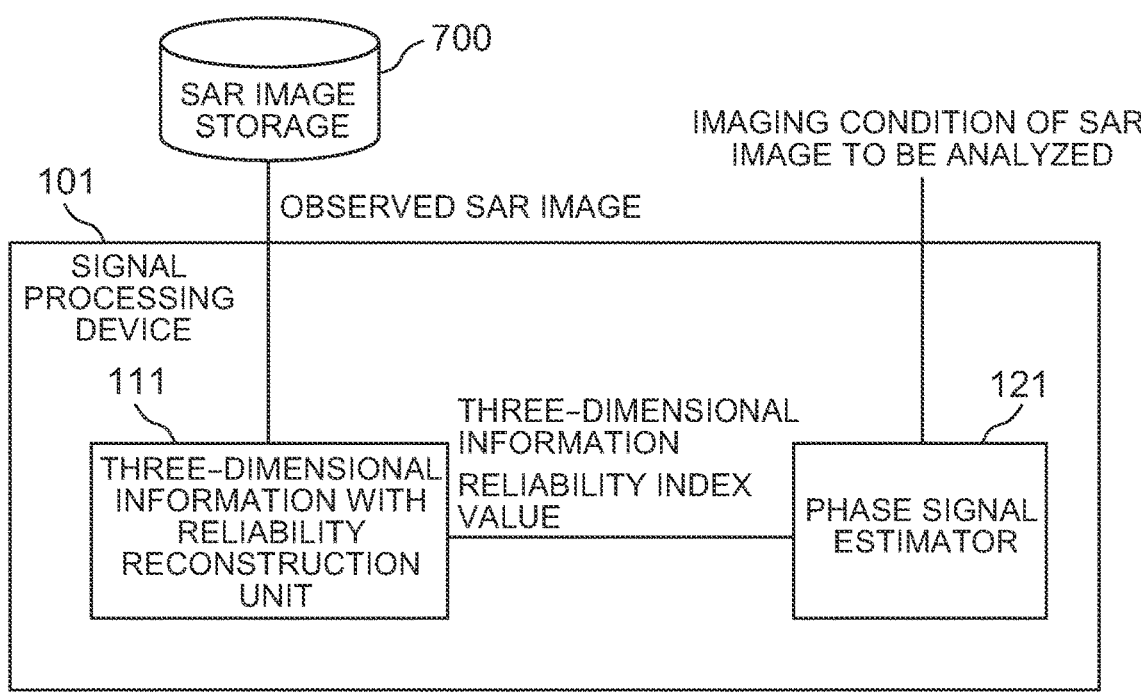
FIG. 7 It depicts a block diagram showing a configuration example of the signal processing device of the first aspect of the first example embodiment.

FIG. 7 is a block diagram showing a configuration example of the signal processing device of the first aspect of the first example embodiment. The signal processing device 101 shown in FIG. 7 comprises a three-dimensional information with reliability reconstruction unit 111 and a phase signal estimator 121.

When the three-dimensional information with reliability reconstruction unit 111 is included in a device other than the signal processing device 101, the signal processing device 101 includes only the phase signal estimator 121.

The SAR image storage 700 stores multiple observed SAR images. The multiple SAR images stored in the SAR image storage 700 includes SAR images taking a steady state. The SAR image storage 700 may be included in the signal processing device 101. The observed SAR image is a complex image that has information on intensity of the irradiated microwaves and a phase for each pixel. In addition, the observation SAR image also includes information on an imaging condition such as the position of the SAR satellite at the time of observation, the coordinates of an area to be analyzed, and a resolution.

The multiple observed SAR images stored in the SAR image storage 700 are input to the three-dimensional information with reliability reconstruction unit 111. Observed SAR images of the steady state are input to the three-dimensional information with reliability reconstruction unit 111. In addition to the observed SAR image of the steady state, an observed SAR image of the case where there is change from the steady state in the area to be analyzed may be input to the three-dimensional information with reliability reconstruction unit 111.

The three-dimensional information with reliability reconstruction unit 111 has a function of reconstructing and outputting three-dimensional information (data having intensity information and phase information at each of three-dimensional positions in a steady state) of the area to be analyzed. The three-dimensional information output by the three-dimensional information with reliability reconstruction unit 111 may be a three-dimensional complex reflectivity distribution having intensity information and phase information. The three-dimensional information may have information such as temperature and displacement in addition to intensity information and phase information. The three-dimensional information may be three-dimensional point cloud data which is a set of points each having intensity information and phase information.

As an example, the three-dimensional information with reliability reconstruction unit 111 operates in the same way as the above three-dimensional information reconstruction unit 910 to generate three-dimensional information.

In addition to the function of generating three-dimensional information, the three-dimensional information with reliability reconstruction unit 111 has a function of calculating an index value (hereinafter referred to as a reliability index value) indicating the reliability of the three-dimensional information and outputting the reliability index value.

An example of how the reliability index value is calculated will be explained.

The observed SAR image is an image in which the received signal is recorded. The three-dimensional information with reliability reconstruction unit 111 calculates a reliability index value by evaluating the discrepancy between the received signal and a received signal (predicted signal) predicted from the reconstructed three-dimensional information for each of the intensity and the phase. The three-dimensional information reconstruction with reliability unit 111 may calculate a reliability index value by evaluating how reliable each estimate in the reconstructed three-dimensional information is among the possible values. The three-dimensional information with reliability reconstruction unit 111 may also combine the evaluation of discrepancy with the evaluation of reliability of the estimated value.

The three-dimensional information with reliability reconstruction unit 111, for example, evaluates discrepancy using a difference between the received signal and the predicted signal. When using a difference between the received signal and the predicted signal, a difference squared error, a difference of absolute values, or the like is used. When evaluating discrepancy, the three-dimensional information reconstruction with reliability unit 111 may evaluate a function in which a term expressing the complexity of the reconstructed three-dimensional information is added to the difference between the received signal and the predicted signal. In general, three-dimensional scatterers exist often sparsely, and a term generally referred to as a regularization term may be included as a term for determining that the solution is better. In particular, the L0, L1, and L2 norms can be employed as the regularization term. When evaluating discrepancy, the three-dimensional information with reliability reconstruction unit 111 may use cross-validation by making the received signal used to evaluate the difference from the predicted value different from the received signal used for three-dimensional information reconstruction, for evaluating generalization ability of the reconstructed three-dimensional information The three-dimensional information with reliability reconstruction unit 111 outputs, for example, parameters (a variance value, a covariance matrix, a confidence interval, etc.) of the posterior distribution of each estimate acquired by Bayesian estimation and a posterior distribution as reliability of the estimate. The three-dimensional information with reliability reconstruction unit 111 may calculate the reliability index value by evaluating a squared error or a loss function in an optimization process when reconstructing the three-dimensional information.

Imaging conditions of one or more SAR images to be analyzed are also input to the phase signal estimator 121. The one or more SAR images to be analyzed are, for example, one or more observed SAR images selected from multiple observed SAR images stored in the SAR image storage 700. Hereinafter, the multiple observed SAR images is sometimes referred to as a group of observed SAR images. In other words, a group of observed SAR images includes multiple observed SAR images.

The SAR image to be analyzed may be one or more newly acquired observed SAR images. The multiple SAR images to be analyzed may include both observed SAR images in the SAR image storage 700 and newly acquired observed SAR images.

The imaging condition of the SAR image to be analyzed, which is input to the phase signal estimator 121, are, for example, the imaging condition in the observed SAR image used to reconstruct three-dimensional information in the three-dimensional information with reliability reconstruction unit 111. However, it may also be the imaging conditions in one or more newly acquired observation SAR images. The imaging condition includes a position of the SAR satellite at the time of observation, coordinates of the area to be analyzed, and a resolution. The imaging condition may be the imaging condition of the observed SAR image stored in the SAR image storage 700 or the imaging condition of a newly acquired observed SAR image.

The three-dimensional information reconstructed by the three-dimensional information with reliability reconstruction unit 111 is input to the phase signal estimator 121. A reliability index value is also input to the phase signal estimator 121 from the three-dimensional information with reliability reconstruction unit 111.

The phase signal estimator 121 calculates the phase signals for all pixels in the analyzed area for all input imaging conditions. In other words, the phase signal estimator 121 estimates the phase signals. For example, when the analyzed area includes an area where there is a possibility of layover (layover area), the phase signal estimator 121 estimates phase signals of the analyzed area including the layover area from the SAR image pair. Further, the phase signal estimator 121 generates information (hereinafter referred to as reliability information) which represents reliability of each of the calculated phase signals using the reliability index value input from the three-dimensional information with reliability reconstruction unit 111.

An example of how reliability information is calculated will be explained.

The phase signal estimator 121 generates reliability information by statistical processing using the calculated phase signals and reliability index values. For example, the phase signal estimator 121 evaluates the reliability of the phase signal using a variance or a covariance matrix of the posterior probability distribution of the acquired three-dimensional information, when the three-dimensional information with reliability reconstruction unit 111 uses Bayesian estimation.

When evaluating reliability, the phase signal estimator 121 may use a standard deviation of prediction that can be calculated for each imaging condition and each pixel. In that case, the phase signal estimator 121 may use the standard deviation of the prediction itself as reliability information, for example. The phase signal estimator 121 may also compare the reliability information in each pixel with a predetermined threshold value to identify pixels with low reliability and use the identification result as the reliability information.

Second Aspect of the First Example Embodiment

Figure 8:
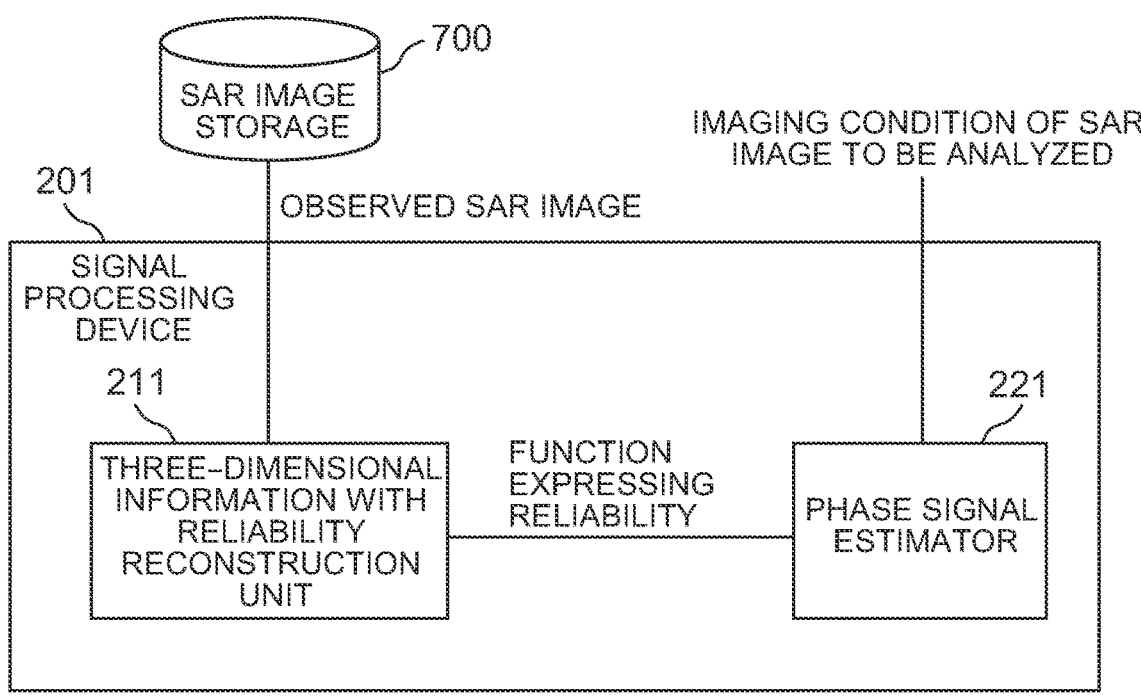
FIG. 8 It depicts a block diagram showing a configuration example of the signal processing device of the second aspect of the first example embodiment.

FIG. 8 is a block diagram showing an example configuration of a signal processing device of the second aspect of the first example embodiment. The signal processing device 201 shown in FIG. 8 comprises a three-dimensional information with reliability reconstruction unit 211 and a phase signal estimator 221.

When the three-dimensional information with reliability reconstruction unit 211 is included in a device other than the signal processing device 201, the signal processing device 201 includes only the phase signal estimator 221.

Multiple observed SAR images stored in the SAR image storage 700 are input to the three-dimensional information with reliability reconstruction unit 211. Observed SAR images observing a steady state are input to the three-dimensional information with reliability reconstruction unit 211. Not only the observed SAR image that observed the steady state, but also the observed SAR image that captured the case where there is a change from the steady state in the area to be analyzed may be input to the three-dimensional information with reliability reconstruction unit 211.

The three-dimensional information with reliability reconstruction unit 211 has a function of reconstructing and outputting three-dimensional information (data having intensity information and phase information at each of three-dimensional positions in a steady state) of the area to be analyzed. As an example, the three-dimensional information with reliability reconstruction unit 211 operates in the same way as the above three-dimensional information reconstruction unit 910 to generate three-dimensional information.

The three-dimensional information with reliability reconstruction unit 211 also has a function to calculate a function that expresses information about how reliable what values are as intensity and phase at each point (each position) in a three-dimensional space with azimuth, range, and elevation directions.

Hereinafter, the function is referred to as three-dimensional information with reliability. It should be noted that the information generated by the three-dimensional information with reliability reconstruction unit 111 shown in FIG. 7, i.e., the combination of three-dimensional information and the reliability index value, also corresponds to the three-dimensional information with reliability.

The three-dimensional information reconstructed by the three-dimensional information with reliability reconstruction unit 211 is input to the phase signal estimator 221. The phase signal estimator 221 also receives the three-dimensional information with reliability from the three-dimensional information with reliability reconstruction unit 211.

The phase signal estimator 221 calculates the phase signals for all pixels in the analyzed area for all input imaging conditions. In other words, the phase signal estimator 221 estimates the phase signals. Further, the phase signal estimator 221 generates information (hereinafter referred to as reliability information) which represents reliability of each of the calculated phase signals using the three-dimensional information with reliability input from the three-dimensional information with reliability reconstruction unit 211.

The information (data) output by the phase signal estimator 221 is the same as that output by the phase signal estimator 121. As described above, the information output by the phase signal estimator 121 is the phase signals and the reliability information for all pixels in the analyzed area for all imaging conditions.

As an example of a SAR image, take an observed SAR image stored in the SAR image storage 700. Suppose that there is an observed SAR image that includes information other than a steady state in the group of observed SAR images. The three-dimensional information with reliability reconstruction unit 211 reconstructs the three-dimensional information of the area to be analyzed based on the group of observed SAR images. Specifically, the three-dimensional information with reliability reconstruction unit 211 generates three-dimensional information with reliability (a function that expresses information about how reliable what values are as intensity and phase at each point). The three-dimensional information involved in the reconstructed three-dimensional information with reliability is affected by information other than the steady state.

[Method of Calculating Three-Dimensional Information With Reliability in the Second Aspect]

The three-dimensional information with reliability reconstruction unit 211 calculates the three-dimensional information with reliability using the posterior distribution, for example. In that case, the three-dimensional information with reliability reconstruction unit 211 takes the three-dimensional information with reliability for the posterior distribution itself, for example. The three-dimensional information with reliability reconstruction unit 211 may also take the three-dimensional information with reliability for parameters of the posterior distribution. The parameters of the posterior distribution include mean, mode, variance, confidence interval, etc. The three-dimensional information with reliability reconstruction unit 211 may also take the three-dimensional information with reliability for a candidate group of posterior sampled three-dimensional information (an estimate of intensity and a phase).

The reconstructed three-dimensional information is affected by information other than the steady state. As a result, the phase signal calculated by the phase signal estimator 221 reflects information other than the steady state.

As a result, the coherence value in the area affected by information other than the steady state will be smaller without any change. In this example embodiment, since the phase signal estimator 221 generates reliability information from the three-dimensional information with reliability reconstruction unit 211, the reliability of the area affected by information other than the steady state is lower. Therefore, when the change detection process is executed, it is possible to avoid evaluating coherence values for positions (pixels) with low reliability. As a result, change can be detected more accurately, when detecting change of the SAR image from the steady state to be analyzed, for example.

Operation of the First Aspect of the First Example Embodiment

Figure 9:
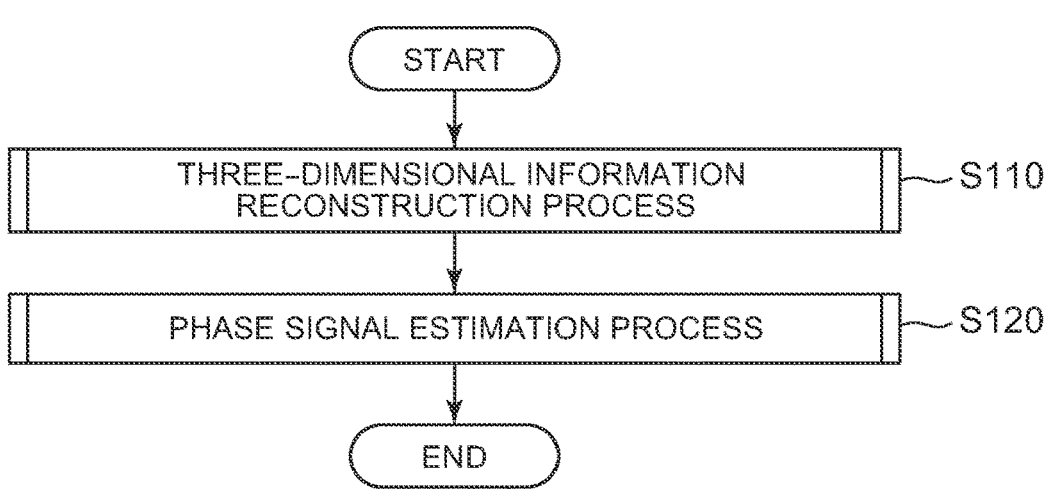
FIG. 9 It depicts a flowchart showing the signal processing performed by the signal processing device of the first aspect of the first example embodiment.

Hereinafter, the signal processing by the signal processing device 101 shown in FIG. 7 will be explained with reference to FIG. 9. FIG. 9 is a flowchart showing the signal processing of the first aspect performed by the signal processing device 101.

In the signal processing device 101, the three-dimensional information with reliability reconstruction unit 111 executes the three-dimensional information reconstruction process (step S110). The three-dimensional information reconstruction process is a process to reconstruct three-dimensional information of the analyzed area based on the stored group of observed SAR images. In step S110, the three-dimensional information reconstruction with reliability unit 111 calculates a reliability index value of the reconstructed three-dimensional information. The method for calculating the reliability index value has already been described.

Next, the phase signal estimator 121 executes the phase signal estimation process (step S120). The phase signal estimation process is a process to calculate phase signals for all pixels in the analyzed area for all imaging conditions based on the imaging conditions of one or more SAR images to be analyzed and reconstructed three-dimensional information. Further, in the phase signal estimation process, the phase signal estimator 121 generates reliability information for each of the calculated phase signals using the reliability index value input from the three-dimensional information with reliability reconstruction unit 111. The method of calculating the reliability information has already been described.

Figure 10:
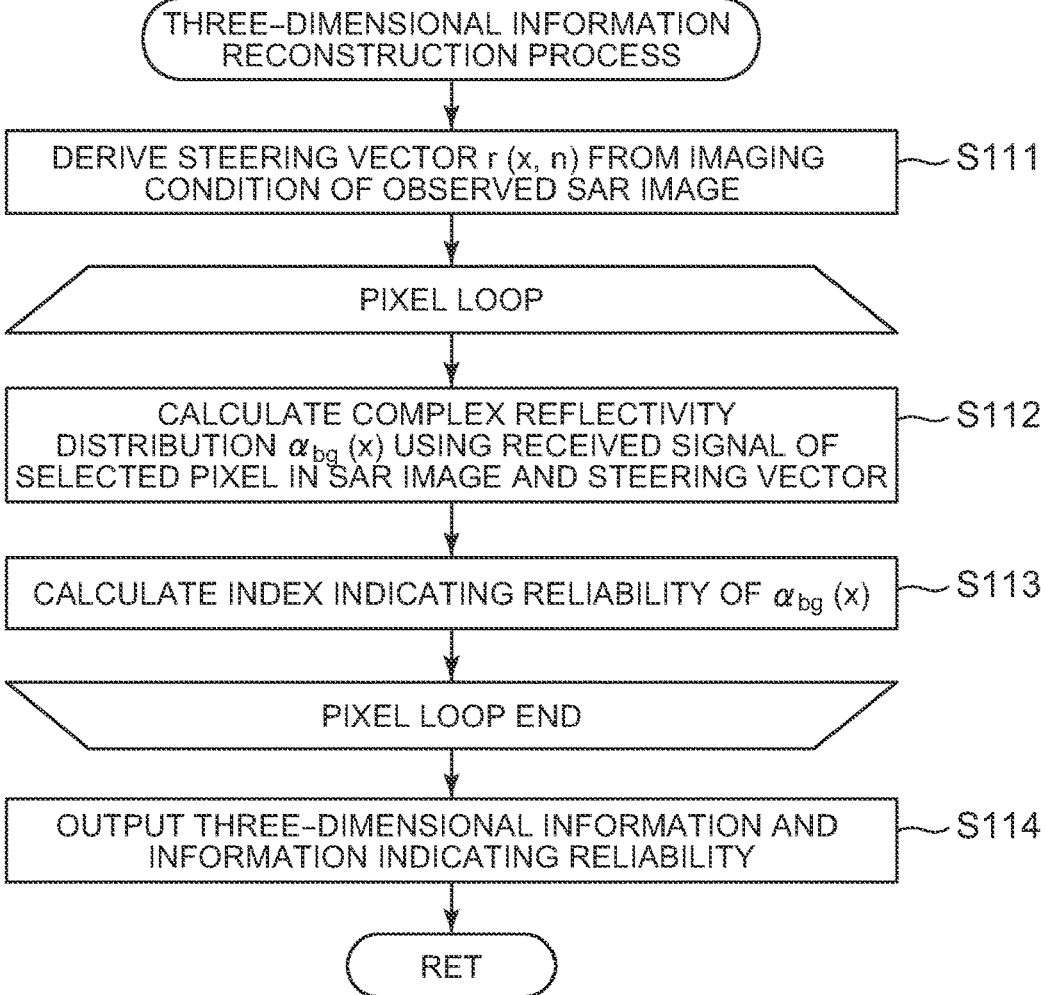
FIG. 10 It depicts a flowchart showing the three-dimensional information reconstruction process in the first aspect of the first example embodiment.

Next, the three-dimensional information reconstruction process (step S110) shown in FIG. 9 will be explained with reference to FIG. 10. FIG. 10 is a flowchart showing the three-dimensional information reconstruction process performed by the three-dimensional information with reliability reconstruction unit 111.

First, the three-dimensional information with reliability reconstruction unit 111 derives the steering vector $r^{\rightarrow}(x^{\rightarrow}, n)$ from the imaging condition of each observed SAR image in the group of observed SAR images (step S111).

Next, the three-dimensional information with reliability reconstruction unit 111 repeatedly executes the process of calculating a complex reflectivity distribution and a reliability index value for each of the multiple pixels.

Specifically, the three-dimensional information with reliability reconstruction unit 111 selects one pixel for which the complex reflectivity distribution has not yet been calculated from among pixels in the group of observed SAR images. The selected pixel corresponds to the selected position in the observed SAR image.

Then, the three-dimensional information with reliability reconstruction unit 111 calculates the complex reflectivity distribution $\alpha_{bg}^{\rightarrow}(x^{\rightarrow})$ using the received signal of the selected pixel (selected position) in the group of observed SAR images and the steering vector for each of the observed SAR images (step S112). In step S112, the complex reflectivity distribution $\alpha_{bg}^{\rightarrow}(x^{\rightarrow})$ is calculated for the pixel corresponding to position $x^{\rightarrow}$.

Further, the three-dimensional information with reliability reconstruction unit 111 calculates the complex reflectivity distribution $\alpha_{bg}^{\rightarrow}(x^{\rightarrow})$ at the pixel being handled using the calculation method described above (step S113). In other words, the three-dimensional information with reliability reconstruction unit 111 calculates the reliability index value of the reconstructed three-dimensional information.

The three-dimensional information with reliability reconstruction unit 111 repeatedly performs processes of steps S112 and S113 until the complex reflectivity distribution for all pixels in the group of observed SAR images has been calculated and the reliability index values for all pixels have been calculated. In other words, the three-dimensional information with reliability reconstruction unit 111 performs pixel loop processing. When the complex reflectivity distribution and reliability index values for all pixels in the group of observed SAR images have been calculated, the pixel loop is terminated. When the pixel loop is terminated, the three-dimensional information of the target area has been reconstructed and the reliability index values have been calculated.

After exiting the pixel loop, the three-dimensional information with reliability reconstruction unit 111 outputs the calculated three-dimensional complex reflectivity distribution as data with intensity information and phase information at three-dimensional positions in steady state, i.e., three-dimensional information, and outputs the calculated reliability index value (step S114). The output reliability index value is the combined value of the reliability index values for each pixel calculated in step S113.

Next, the phase signal estimation process (step S120) shown in FIG. 9 will be explained with reference to FIG. 11.

FIG. 11 is a flowchart showing the phase signal estimation process performed by the phase signal estimator 121.

First, the phase signal estimator 121 derives the steering vector $r^{\rightarrow}(x^{\rightarrow},n)$ from each of the imaging conditions of all input SAR images to be analyzed (step S121).

Next, the phase signal estimator 121 repeatedly executes the process of calculating simulated complex signals and the reliability of the simulated complex signals for each of the imaging conditions of the SAR image to be analyzed. Namely, the phase signal estimator 121 performs the imaging condition loop processing.

Specifically, in the imaging condition loop processing, the phase signal estimator 121 selects one imaging condition that has not yet been used for the phase signal estimation process from among imaging conditions of the SAR image to be analyzed.

Then, the phase signal estimator 121 performs pixel loop processing. In the pixel loop processing, the phase signal estimator 121 selects one pixel from the pixels of the group of observed SAR images corresponding to the selected imaging condition for which the phase signal has not yet been calculated.

The phase signal estimator 121 repeats the processes of steps S122 and S123 until the phase signals and the reliability for all pixels in the group of observed SAR images corresponding to the selected imaging condition have been calculated. When the simulated complex signals and the reliability of the simulated complex signals for all pixels in the observed SAR images corresponding to the selected imaging conditions have been calculated, the pixel loop is terminated. When the pixel loop is terminated, the simulated complex signals and the reliability of the simulated complex signals for all pixels in the observed SAR image corresponding to the selected imaging condition have been calculated. In other words, the phase signals for all pixels in the analyzed area for all imaging conditions and the reliability information representing the reliability of the phase signals are calculated.

In step S122, the phase signal estimator 121 calculates the phase $\angle g_{sim}(x^{\rightarrow},n)$ of the simulated complex signal $g_{sim}(x^{\rightarrow},n)$ at the position $x^{\rightarrow}$ corresponding to the selected pixel using the input complex reflectivity distribution $\alpha_{bg}^{\rightarrow}(x^{\rightarrow})$ and the steering vector $r^{\rightarrow}(x^{\rightarrow},n)$ corresponding to the selected imaging condition. The phase signal estimator 121 calculates the simulated complex signal according to equation (3), for example. The phase signal estimator 121 may calculate the simulated complex signal according to an equation other than equation (3).

$$g_{sim}(x,n)=r(x,n)\cdot\alpha_{bg}(x) \tag{3}$$

Further, the phase signal estimator 121 calculates information (reliability information) that represents the reliability of the phase $\angle g_{sim}(x^{\rightarrow},n)$ by statistical processing using the reliability index that indicates the reliability of the reconstructed three-dimensional information and the calculated phase signals (step S123). The method of calculating the reliability information has already been explained.

The phase signal estimator 121 exits the imaging condition loop when the pixel loop processing is executed for all imaging conditions. When exiting the imaging condition loop, phase signals for pixels in the target area corresponding to each of the imaging conditions of all input SAR images to be analyzed and the reliability information of each phase signal have been generated.

After exiting the imaging condition loop, the phase signal estimator 121 outputs phase signals suitable for the imaging conditions of the input SAR images to be analyzed and the reliability information for each phase signal (step S124). It should be noted that when there are multiple imaging conditions, there are also multiple phase signals and reliability information to be output.

Effect of the First Aspect of the First Example Embodiment

In this example embodiment, the signal processing device 101 outputs the reliability information indicating the reliability of the phase signal in addition to the phase signal. As a result, when change detection processing is executed, for example, a false detection caused by the mixing of information other than the steady state information can be prevented and the accuracy of change detection is improved. False detection means that a change is detected incorrectly when change detection is executed using the calculated phase signal, for example. For example, the non-steady state is a state where the intensity becomes small temporarily due to noise mixture, appearance of an object with high intensity, or radar shadow.

Operation of the Second Aspect of the First Example Embodiment

Hereinafter, the signal processing by the signal processing device 201 of the second aspect of this example embodiment will be explained with reference to FIG. 12. FIG. 12 is a flowchart showing the signal processing of the second aspect performed by the signal processing device 201 shown in FIG. 8.

In the signal processing device 201, the three-dimensional information with reliability reconstruction unit 211 performs the three-dimensional information reconstruction process using the calculation method already described (step S210). As described above, the three-dimensional information reconstruction process is a process to calculate a function (three-dimensional information with reliability) that expresses information about how reliable what values are as intensity and phase at each point in a three-dimensional space having azimuth, range, and elevation directions.

The three-dimensional information with reliability involves three-dimensional information and information indicating reliability of the three-dimensional information. In other words, the three-dimensional information with reliability essentially includes the three-dimensional information and the information indicating the reliability of the three-dimensional information.

Next, the phase signal estimator 221 executes the phase signal estimation process (step S220). The phase signal estimation process is a process to calculate phase signals for all pixels in the analyzed area for all imaging conditions. Further, the phase signal estimator 221 generates reliability information for each of the calculated phase signals using the three-dimensional information with reliability input from the three-dimensional information with reliability reconstruction unit 211.

Next, the three-dimensional information reconstruction process (step S210) shown in FIG. 12 will be explained with reference to FIG. 13. FIG. 13 is a flowchart showing the three-dimensional information reconstruction process performed by the three-dimensional information with reliability reconstruction unit 211.

First, the three-dimensional information with reliability reconstruction unit 211 derives the steering vector $r^{\rightarrow}(x^{\rightarrow}, n)$ from the imaging conditions of each observed SAR image in the group of observed SAR images (step S211).

Next, the three-dimensional information with reliability reconstruction unit 211 repeatedly executes the process of calculating three-dimensional information with reliability for each of the multiple pixels.

Specifically, the three-dimensional information with reliability reconstruction unit 211 selects one pixel for which the phase signal has not yet been calculated from among pixels in the group of observed SAR images. The selected pixel corresponds to the selected position in the observed SAR image.

Then, the three-dimensional information with reliability reconstruction unit 211 estimates a function that expresses information about how reliable what values are as intensity and phase, i.e., the three-dimensional information with reliability, based on the received signals of selected pixels (selected positions) in the group of observed SAR images (step S212).

The three-dimensional information with reliability reconstruction unit 211 repeatedly performs the process of step S212 until the complex reflectivity distribution for all pixels in the group of observed SAR images has been calculated. In other words, the three-dimensional information with reliability reconstruction unit 211 performs pixel loop processing. When the three-dimensional information with reliability for all pixels in the group of observed SAR images has been calculated, the pixel loop is terminated. When the pixel loop is terminated, the three-dimensional information with reliability for the target area has been generated.

After exiting the pixel loop, the three-dimensional information with reliability reconstruction unit 211 outputs the three-dimensional information with reliability (step S214).

Next, the phase signal estimation process (step S220) shown in FIG. 12 will be explained with reference to FIG. 14. FIG. 14 is a flowchart showing the phase signal estimation process performed by the phase signal estimator 221.

First, the phase signal estimator 221 derives the steering vector $\vec{r}(\vec{x},n)$ from each of the imaging conditions of all input SAR images to be analyzed (step S221).

Next, the phase signal estimator 221 performs the imaging condition loop processing. In the imaging condition loop processing, the phase signal estimator 221 selects one imaging condition that has not yet been used to calculate the phase signal from among imaging conditions of the SAR image to be analyzed.

Then, the phase signal estimator 221 executes pixel loop processing. In the pixel loop processing, the phase signal estimator 221 selects one pixel from the pixels of the group of observed SAR images corresponding to the selected imaging condition for which the phase signal has not yet been calculated. Then, the phase signal estimator 221 estimates the multiple simulated complex signal candidates estimated from the three-dimensional information with reliability and reliability of each simulated complex signal candidate, and performs the estimation process to estimate the likely phase (step S222). When the estimation process has been executed for all pixels in the group of observed SAR images corresponding to the selected imaging condition, the pixel loop is terminated.

When exiting the imaging condition loop, phase signals for pixels in the target area corresponding to each of the imaging conditions of all input SAR images to be analyzed and the reliability information of each phase signal have been generated.

This is the same as in the first aspect of the first example embodiment. In other words, the phase signal estimator 221 generates the same information (data) that the phase signal estimator 121 outputs.

After exiting the imaging condition loop, the phase signal estimator 221 outputs phase signals suitable for the imaging conditions of the input SAR images to be analyzed and the reliability information for each phase signal (step S224). It should be noted that when there are multiple imaging conditions, there are also multiple phase signals and reliability information to be output.

Effect of the Second Aspect of the First Example Embodiment

In this example embodiment, the signal processing device 201 outputs reliability information indicating the reliability of the phase signal in addition to the phase signal. As a result, when change detection processing is executed, for example, a false detection caused by the mixing of information other than the steady state information can be prevented and the accuracy of change detection is improved.

In addition, compared to the case where the process of generating three-dimensional information using multiple SAR images before the change is performed and the process of generating three-dimensional information using multiple newly acquired SAR images after the change is performed, the signal processing devices 101, 201 can save effort of acquiring a sufficient number of SAR images to reconstruct three-dimensional information after the change. This is because the signal processing devices 101, 201 in this example embodiment do not need a process of generating three-dimensional information using multiple SAR images to be analyzed.

It is also possible to reconstruct a three-dimensional information using DEM (Digital Elevation Model) and eliminate a phase signal in the layover area by referring to the three-dimensional information. However, when using SAR tomography, phase signal elimination can be performed more precisely than when using DEM. That is because the phase signals can be estimated for each structure such as a building when the three-dimensional information is reconstructed using SAR tomography, while only phase information regarding large structures is reflected in the three-dimensional when using DEM. In addition, when a three-dimensional information is reconstructed using SAR tomography, accurate phase signal estimation is possible even if the structures are complexly distributed in the analyzed area.

When a three-dimensional information is reconstructed using SAR tomography, a received signal model is generated that is closer to the actual three-dimensional information than when a three-dimensional information is reconstructed using DEM. That is because when using SAR tomography, three-dimensional point cloud data with intensity and phase information is generated. In addition, as described below, reconstruction of a three-dimensional information by using SAR tomography has the advantage that a received signal model that is closer to the actual three-dimensional information can be generated, as compared with reconstruction of a three-dimensional information by using LiDAR (Light Detection and Ranging). The same advantage also exists when means that can reproduce the intensity and phase other than SAR tomography is used as means calculating three-dimensional information.

Example Embodiment 2

Figure 15:
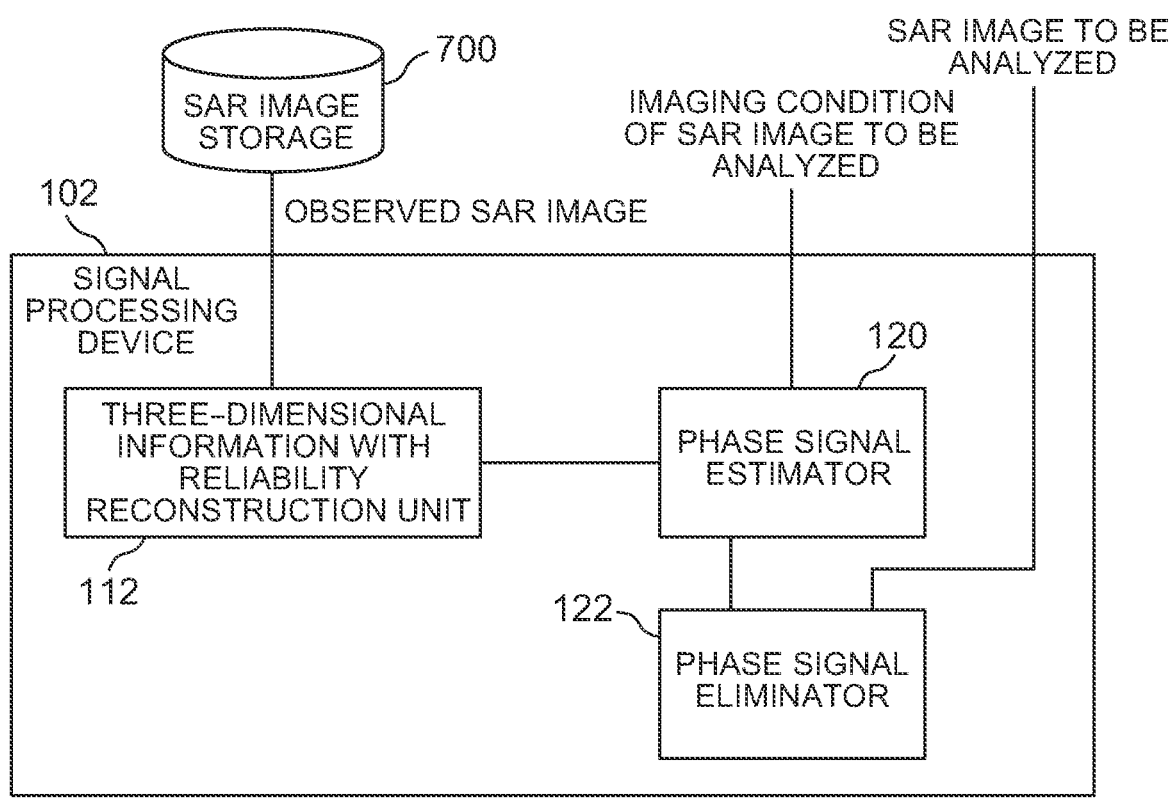
FIG. 15 It depicts a block diagram showing a configuration example of the signal processing device of the second example embodiment.

FIG. 15 is a block diagram showing an example configuration of a signal processing device of the second example embodiment. The signal processing device 102 shown in FIG. 15 comprises a three-dimensional information with reliability reconstruction unit 112, a phase signal estimator 120, and a phase signal eliminator 122. Multiple SAR images to be analyzed are input to the phase signal eliminator 122.

The three-dimensional information with reliability reconstruction unit 111 and the phase signal estimator 121 in the first aspect of the first example embodiment (refer to FIG. 7) can be used as the three-dimensional information with reliability reconstruction unit 112 and the phase signal estimator 120. The three-dimensional information with reliability reconstruction unit 211 and phase signal estimator 221 in the second aspect of the first example embodiment (refer to FIG. 8) can also be used as the three-dimensional information with reliability reconstruction unit 112 and phase signal estimator 120.

Figure 16:
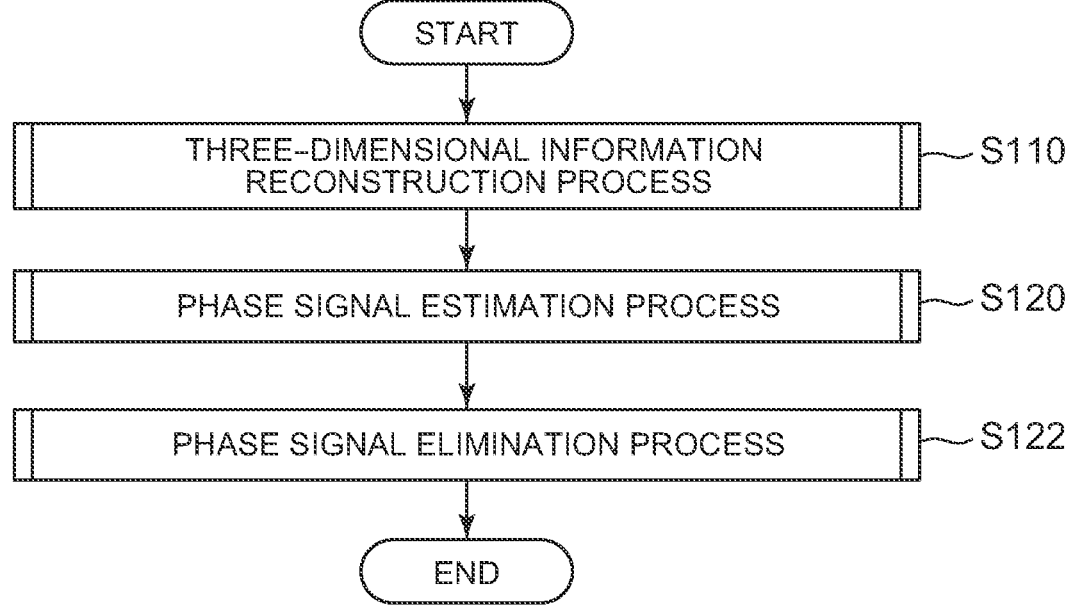
FIG. 16 It depicts a flowchart showing the signal processing performed by the signal processing device of the second example embodiment.

Next, the overall operation of the signal processing device 102 of the second example embodiment will be explained with reference to the flowchart in FIG. 16. The process shown in FIG. 16 is a process in which the phase signal elimination process (step S122) performed by the phase signal eliminator 122 is added to the process (steps S110, S120) in the first aspect of the first example embodiment shown in FIG. 9.

The signal processing device 102 may perform a process in which the phase signal elimination process (step S122) is added to the process (steps S210, S220) in the second aspect of the first example embodiment shown in FIG. 12.

The three-dimensional information with reliability reconstruction unit 112 operates in the same manner as in the first example embodiment to reconstruct the three-dimensional information of the analyzed area (step S110).

In step S120, the phase signal estimator 120 calculates the phase signals for all pixels in the analyzed area of each of the multiple SAR images for all input imaging conditions. Further, the phase signal estimator 221 generates reliability information for each of the calculated phase signals using the reliability index values input from the three-dimensional information with reliability reconstruction unit 211.

The phase signal eliminator 122 eliminates the phase signal estimated by the phase signal estimator 221 (step S122).

Figure 17:
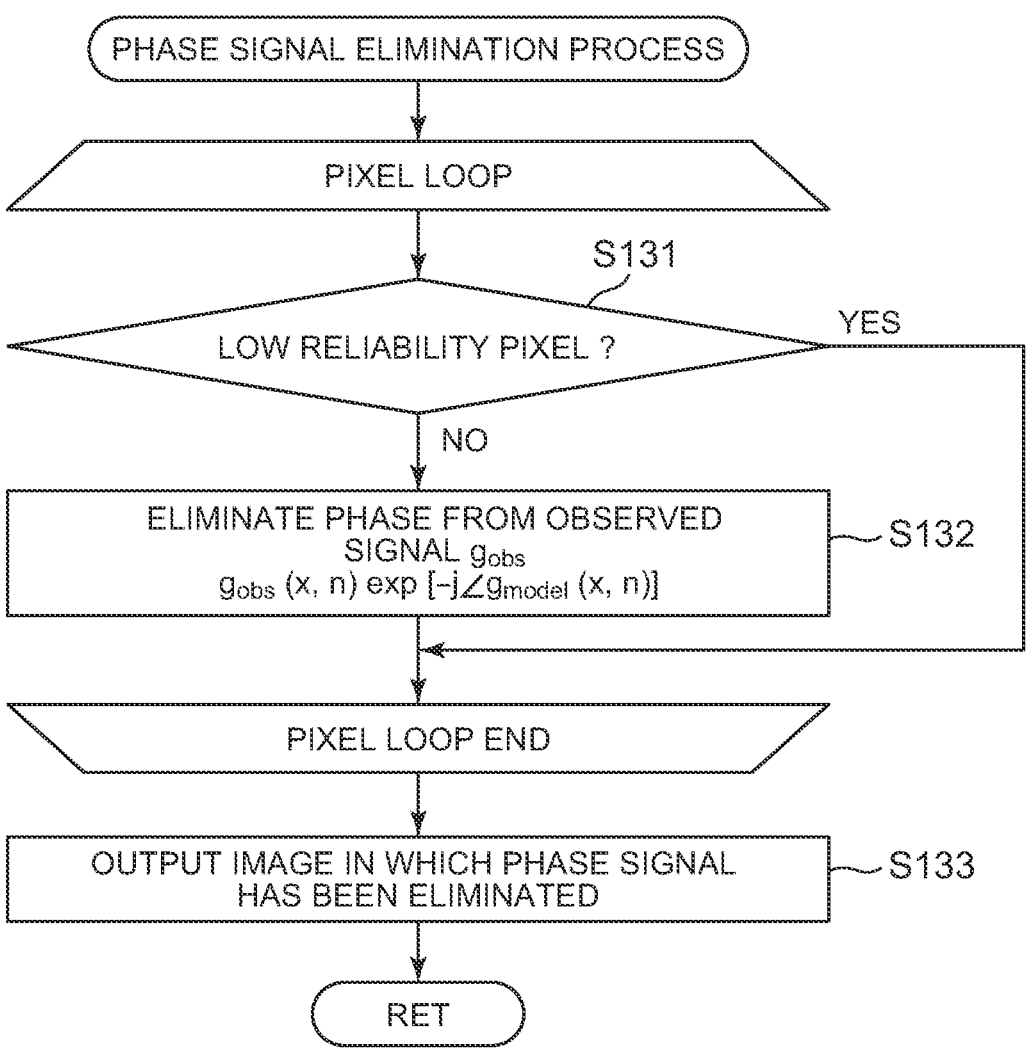
FIG. 17 It depicts a flowchart showing the phase signal elimination process in the second example embodiment.

FIG. 17 is a flowchart showing the phase signal elimination process performed by the phase signal eliminator 122.

The phase signal eliminator 122 repeats the processes of steps S131 and S132 until the reliability information has been determined for all pixels in all SAR images to be analyzed. In other words, the phase signal eliminator 122 performs pixel loop processing. For example, the phase signal eliminator 122 determines that the reliability is low when the value indicated by the reliability information is smaller than a predetermined threshold value in the process of step S131. When the reliability information for all pixels has been determined, the pixel loop is terminated.

In step S132, the phase signal eliminator 122 eliminates the phase signal for each pixel of the SAR image to be analyzed that is determined to have low reliability based on the reliability information, as expressed in formula (4).

$$g_{obs} \exp(-j\angle g_{model}) \qquad (4)$$

It should be noted that $g_{obs}$ is an observed signal (a observed value, i.e., a pixel value of the SAR image) in the SAR image to be analyzed input to the phase signal eliminator 122. In addition, $\angle g_{model}$ is a phase signal estimated by the phase signal estimator 120.

When the pixel loop processing is completed, the phase signal eliminator 122 outputs multiple SAR images to be analyzed in which the phase signals have been eliminated (step S133). In the output images, phase signals of pixels with low reliability are not eliminated. When multiple SAR images of observation targets are input to the phase signal eliminator 122, the phase signal eliminator 122 outputs multiple SAR images of observation targets in which the phase signals are eliminated.

Example Embodiment 3

Figure 18:
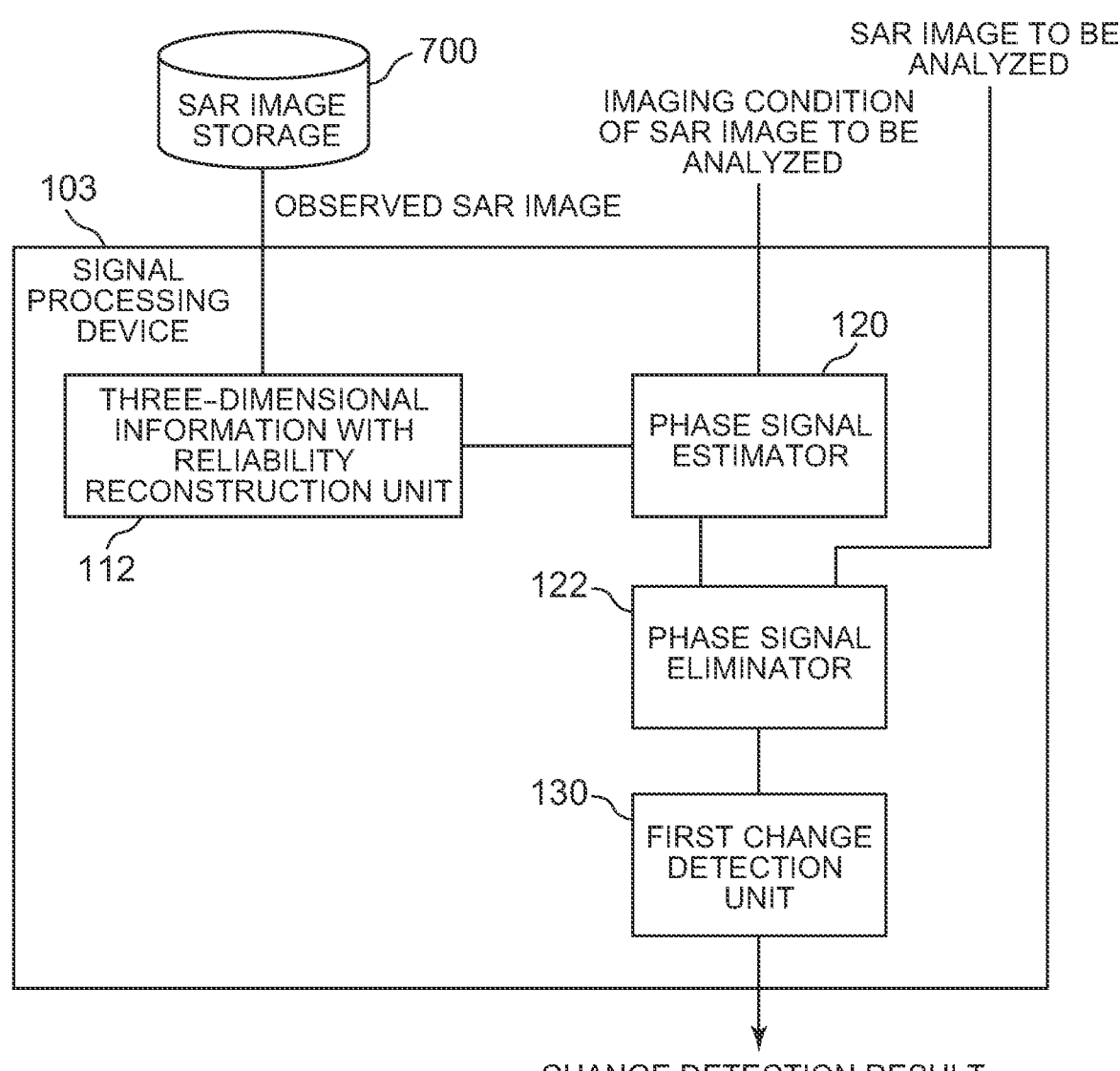
FIG. 18 It depicts a block diagram showing a configuration example of the signal processing device of the third example embodiment.

FIG. 18 is a block diagram showing a configuration example of the signal processing device of the third example embodiment. The signal processing device 103 shown in FIG. 18 corresponds to the signal processing device 102 of the second example embodiment to which the first change detection unit 130 is added. Multiple SAR images of observation targets in which phase signals have been eliminated are input to the first change detection unit 130.

The first change detection unit 130 has a function of outputting correlation (a correlation value) calculated by the correlation process as a change detection result. The first change detection unit 130 may compare the value calculated by the correlation process with a predetermined threshold value and output information (data) indicating the presence or absence of change based on the comparison result as a change detection result. The first change detection unit 130 may operate in the same manner as the change detection unit 930 in the reference example. However, the aspect of the input data of the first change detection unit 130 is different from the aspect of the input data of the change detection unit 930.

The correlation (correlation value) represents, for example, the degree to which multiple SAR images to be analyzed are similar (hereafter referred to as "similarity"). The similarity is expressed in terms of the distance between the images. The degree of similarity is expressed, as an example, by the distance between the multiple images. The similarity may be expressed as an index other than the distance between the images. Hereinafter, similarity may be expressed as correlation.

Figure 19:
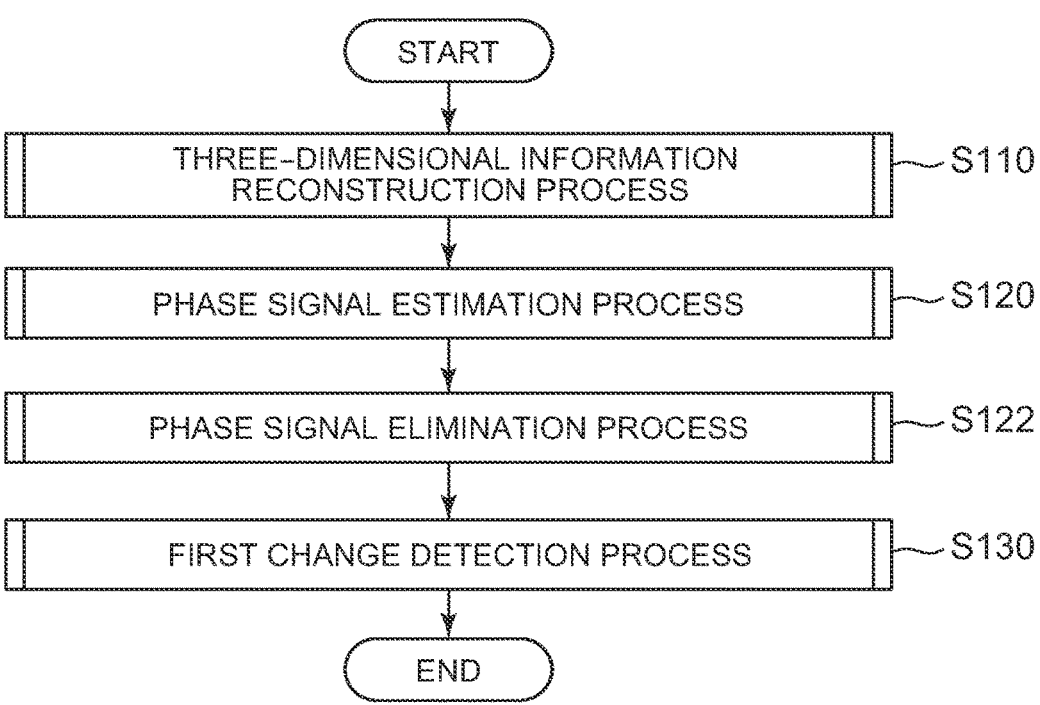
FIG. 19 It depicts a flowchart showing the signal processing performed by the signal processing device of the third example embodiment.

Next, the overall operation of the signal processing device 103 of the third example embodiment will be explained with reference to the flowchart in FIG. 19. The process shown in FIG. 19 is a process in which the first change detection process (step S130) performed by the first change detection unit 130 is added to the processes (steps S110, S120, S122) in the second example embodiment shown in FIG. 16.

Figure 20:
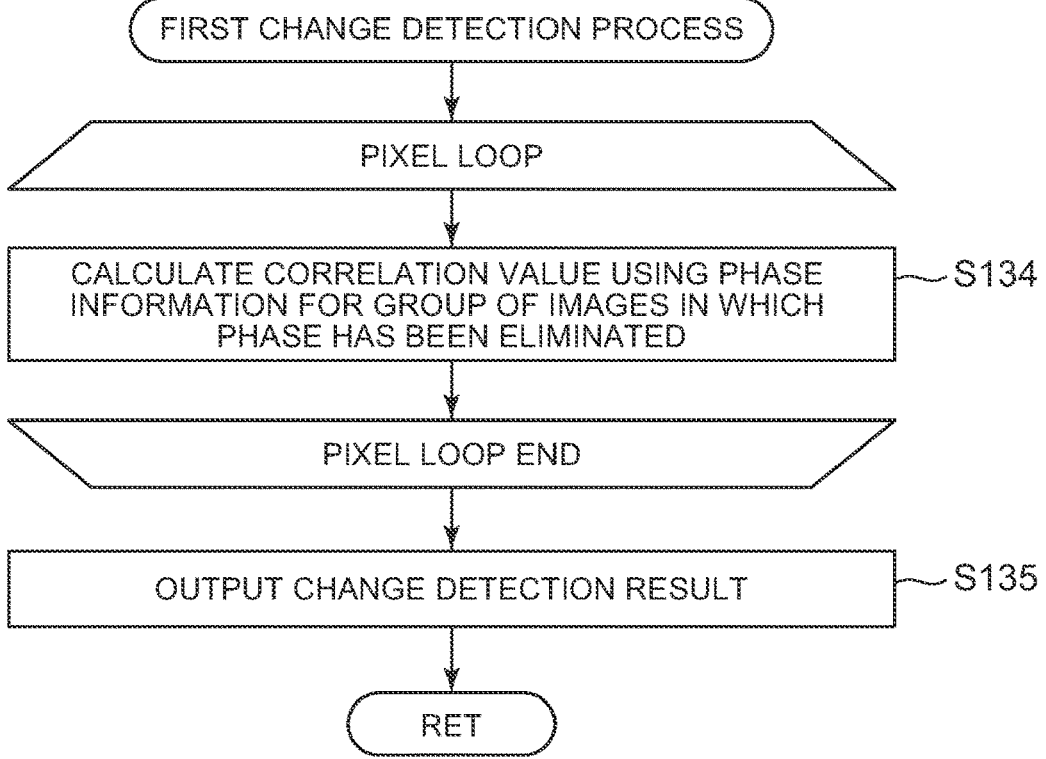
FIG. 20 It depicts a flowchart showing the first change detection process in the third example embodiment.

Next, the first change detection process (step S130) shown in FIG. 19 will be explained with reference to FIG. 20. FIG. 20 is a flowchart showing the first change detection process.

The first change detection unit 130 repeatedly executes the process of step S134 (correlation process) until the correlation values for all pixels have been calculated among multiple SAR images to be analyzed. In other words, the first change detection unit 130 performs pixel loop processing. When the first change detection unit 130 executes the processing of step S134 for all pixels output from the phase signal eliminator 122, the pixel loop is terminated. Among all pixels output from the phase signal eliminator 122, the phase signals are eliminated for pixels with high reliability.

In step S134, the first change detection unit 130 calculates the correlation of the selected pixels in the multiple SAR images to be analyzed. The selected pixels are pixels at the same position in the multiple SAR images to be analyzed.

For example, the first change detection unit 130 uses a coherence value as the correlation. The first change detection unit 130 may adopt a value other than the coherence value, which is calculated by the correlation process using the phase information. As an example, the first change detection unit 130 may extract the phase information from the SAR image as a real value and correlate it with the extracted real value. The first change detection unit 130 may calculate, as a similarity, for example, the difference squared between the phase of the selected pixel in one SAR image to be analyzed and the phase of the selected pixel in another SAR image to be analyzed.

After exiting the pixel loop, the first change detection unit 130 outputs the change detection result including the calculated correlation for each pixel (step S135). In this example embodiment, the change detection result is a value calculated by the correlation process using the phase for the group of images from which the phase has been eliminated for pixels with high reliability, or a result of determining the presence or absence of change by the thresholding process.

Example Embodiment 4

Figure 21:
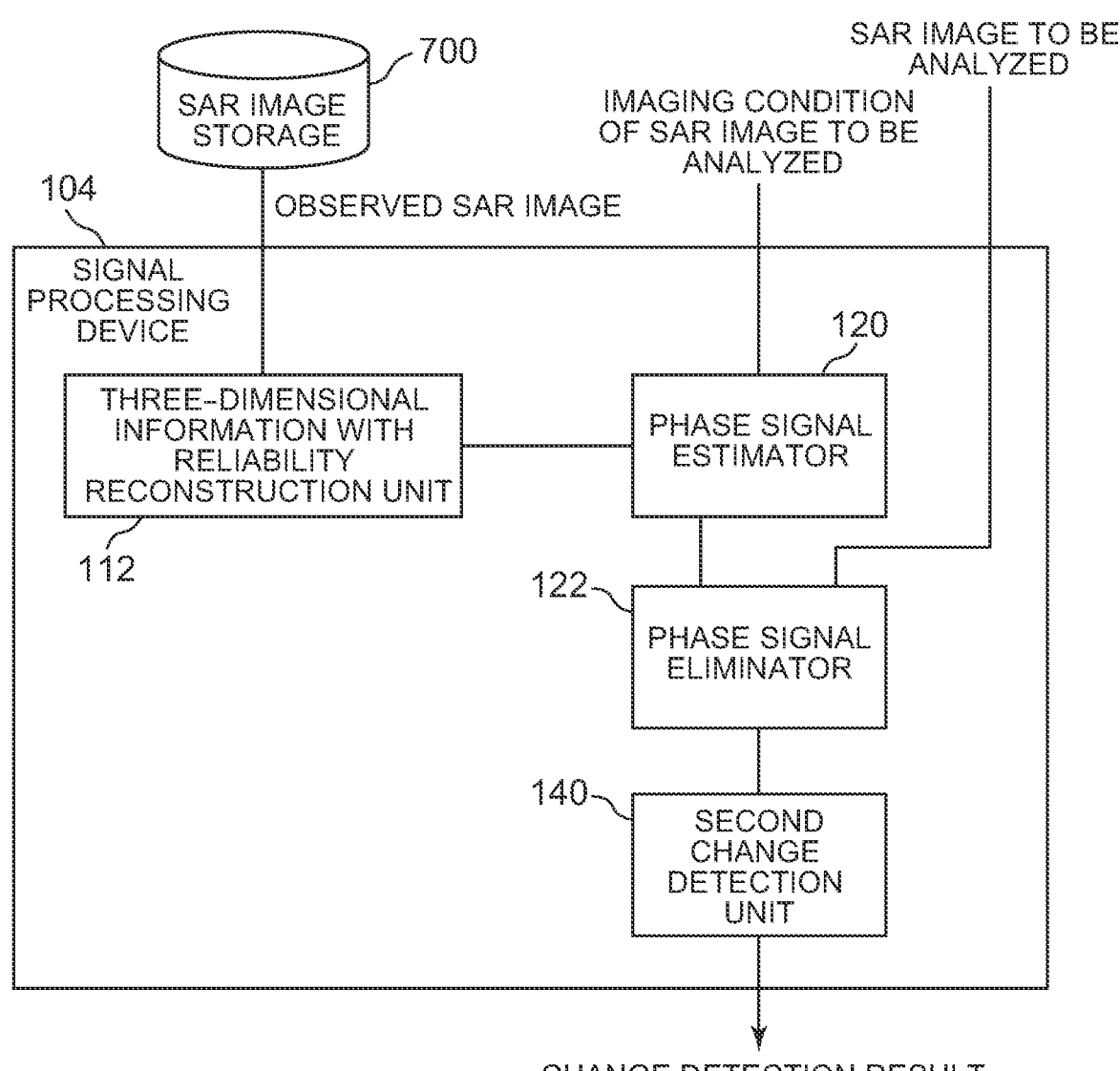
FIG. 21 It depicts a block diagram showing a configuration example of the signal processing device of the fourth example embodiment.

FIG. 21 is a block diagram showing an example configuration of the signal processing device of the fourth example embodiment. The signal processing device 104 shown in FIG. 21 corresponds to the signal processing device 102 of the second example embodiment to which a second change detection unit 140 is added. Multiple SAR images of observation targets in which phase signals have been eliminated are input to the second change detection unit 140.

The second change detection unit 140 performs correlation process using phase information for each pair of multiple SAR images to be analyzed. Further, the second change detection unit 140 detects changes by using statistics acquired from the values calculated for each pair. As a statistic, for example, mean or median of the values calculated by the correlation process using the phase information can be used.

The second change detection unit 140 may compare the difference between the statistic and the individual values and output information (data) indicating the presence or absence of change based on the comparison results as a change detection result.

Figure 22:
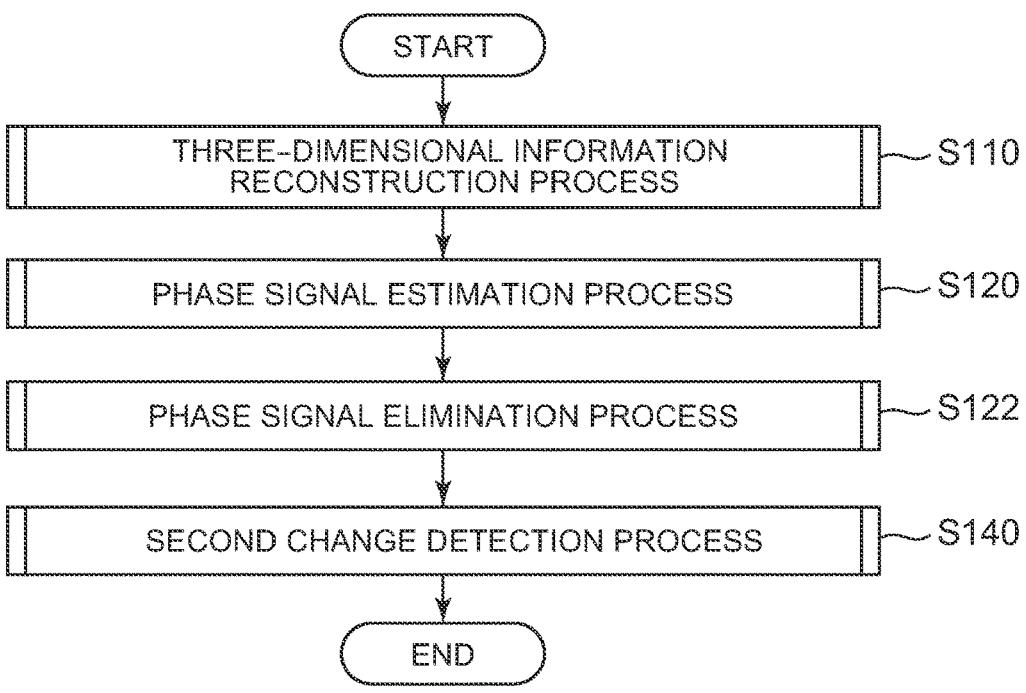
FIG. 22 It depicts a flowchart showing the signal processing performed by the signal processing device of the fourth example embodiment.

Next, the overall operation of the signal processing device 104 of the fourth example embodiment will be explained with reference to the flowchart in FIG. 22. The process shown in FIG. 22 is a process in which a second change detection process (step S140) performed by the second change detection unit 140 is added to the process in the second example embodiment shown in FIG. 16 (steps S110, S120, S122). The second change detection process is a process to detect changes by executing a correlation process using phase information for each pair of multiple SAR images to be analyzed and using statistics acquired from the calculated multiple correlations.

Figure 23:
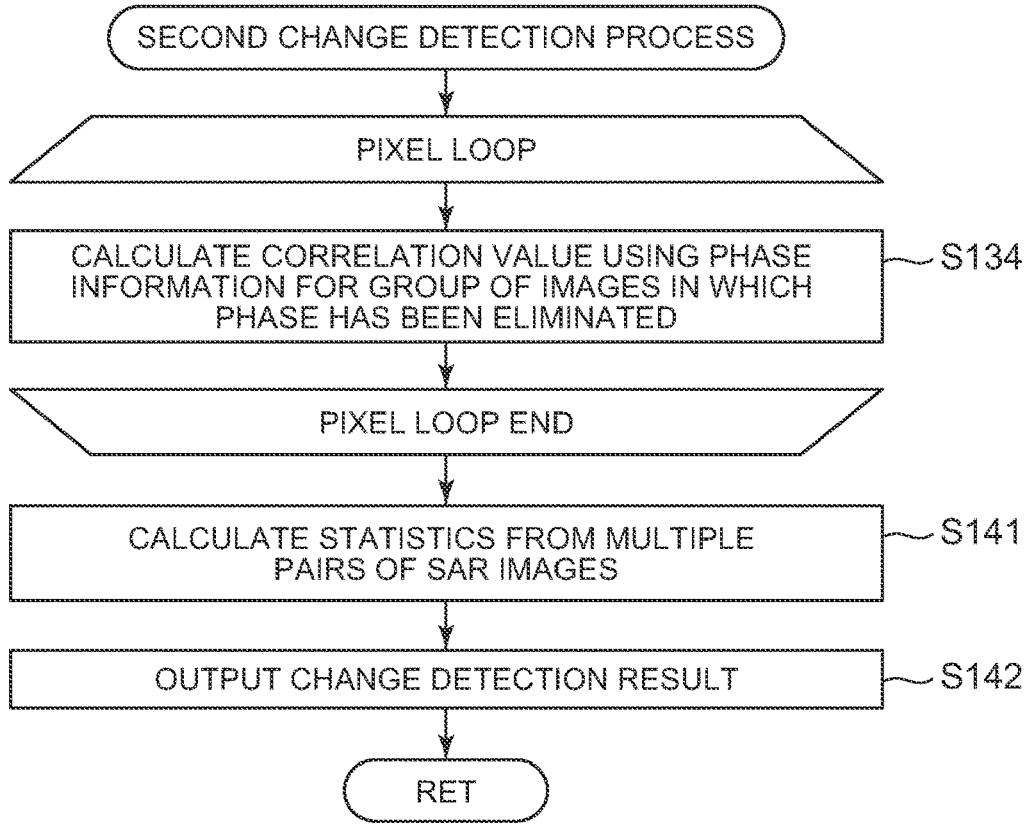
FIG. 23 This flowchart shows the second change detection process in the fourth example embodiment.

Next, the second change detection process (step S140) shown in FIG. 22 will be explained with reference to FIG. 23. FIG. 23 is a flowchart showing the second change detection process.

The second change detection unit 140 repeatedly executes the process of step S134 (correlation process) until the correlation values for all pixels have been calculated among multiple SAR images to be analyzed. In other words, the second change detection unit 140 performs pixel loop processing in the same manner as the first change detection unit 130 in the third example embodiment.

When exiting the pixel loop, the second change detection unit 140 calculates the statistics of the values calculated by correlation processes of each pair (step S141). Then, the second change detection unit 140 outputs the change detection result including the calculated statistics (step S142).

Example Embodiment 5

Figure 24:
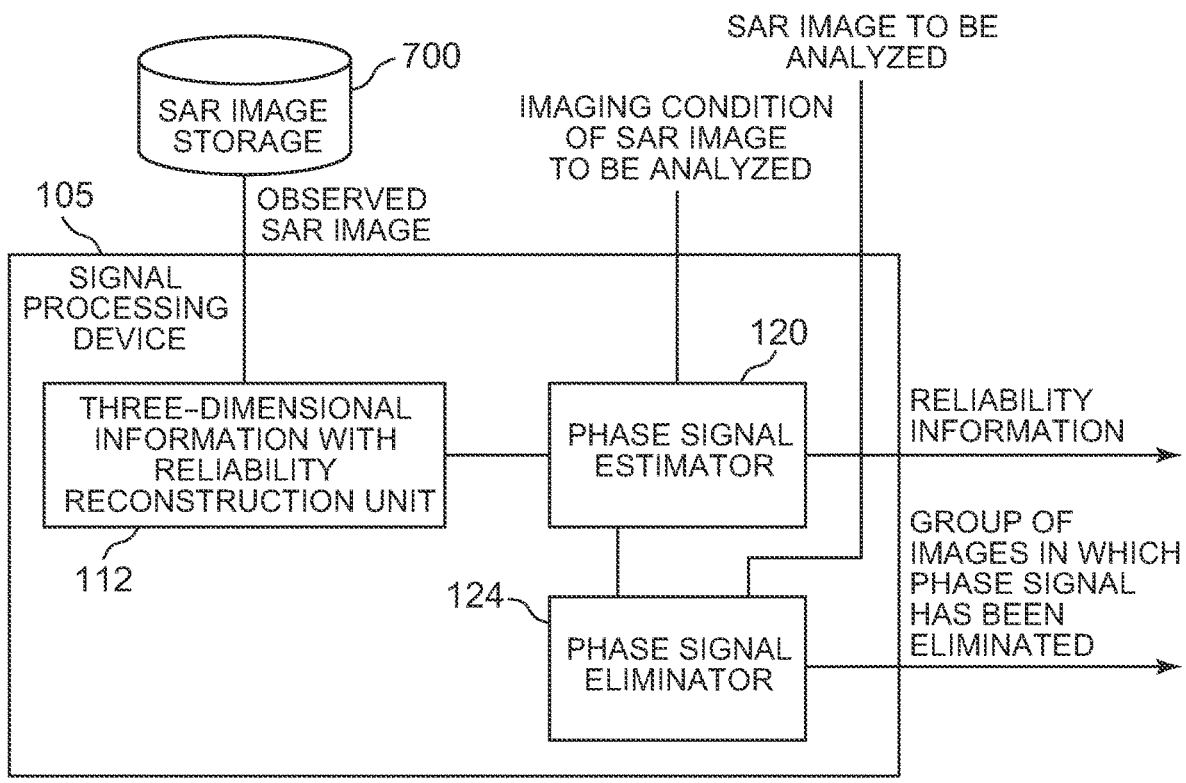
FIG. 24 It depicts a block diagram showing a configuration example of the signal processing device of the fifth example embodiment.

FIG. 24 is a block diagram showing an example configuration of a signal processing device of the fifth example embodiment. The signal processing device 105 shown in FIG. 24 comprises a three-dimensional information with reliability reconstruction unit 112, a phase signal estimator 120, and a phase signal eliminator 124. Multiple SAR images to be analyzed are input to the phase signal eliminator 124.

The signal processing device 105 is a device that has a phase signal eliminator 124 instead of the phase signal eliminator 122 in the signal processing device 102 of the second example embodiment. Unlike the phase signal eliminator 122, the phase signal eliminator 124 does not use reliability information. That is, the phase signal eliminator 124 uses only the phase of the phase signals and the reliability information for all pixels in the multiple SAR images to be analyzed generated by the phase signal estimator 120.

Next, the overall operation of the signal processing device 104 of the fifth example embodiment will be explained with reference to the flowchart in FIG. 25. The process shown in FIG. 25 includes a phase signal elimination process (step S124) performed by the phase signal eliminator 124 instead of the process of step S122 in the second example embodiment shown in FIG. 16.

Figure 26:
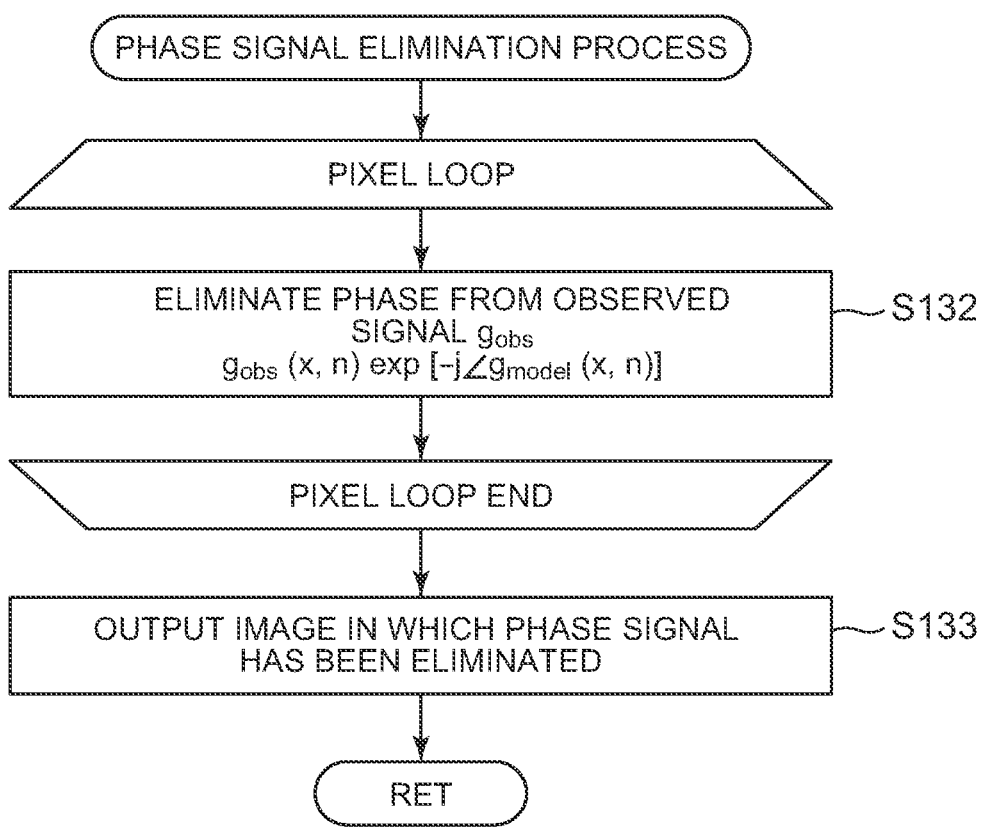
FIG. 26 It depicts a flowchart showing the phase signal elimination process in the fifth example embodiment.

FIG. 26 is a flowchart showing the phase signal elimination process in step S124.

The phase signal eliminator 124 repeats the process of step S132 for all pixels in all SAR images to be analyzed. In other words, the phase signal eliminator 122 performs pixel loop processing.

The process of step S132 is the same as the process of step S132 in the second example embodiment (refer to FIG. 17), but in this example embodiment, the process of step S132 is performed for all pixels.

When the pixel loop processing is terminated, the phase signal eliminator 124 outputs the SAR image of the analysis target in which the phase signals have been eliminated (step S133). When multiple SAR images of observation targets are input to the phase signal eliminator 124, the phase signal eliminator 124 outputs multiple SAR images of observation targets in which the phase signal has been eliminated.

The phase signal estimator 120 may output reliability information outside the signal processing device 105.

Example Embodiment 6

Figure 27:
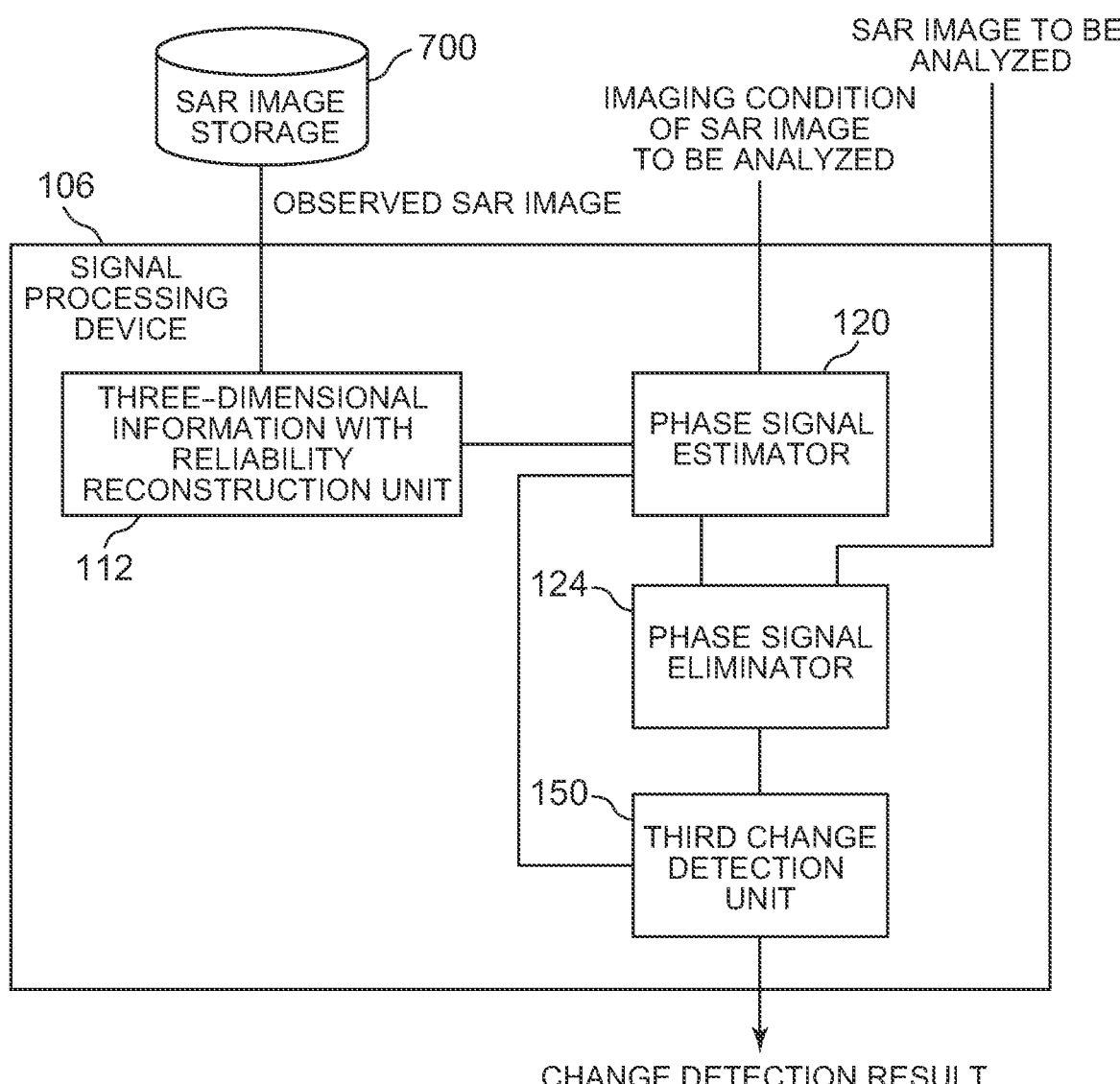
FIG. 27 It depicts a block diagram showing a configuration example of the signal processing device of the sixth example embodiment.

FIG. 27 is a block diagram showing an example configuration of the signal processing device of the sixth example embodiment. The signal processing device 106 shown in FIG. 27 corresponds to the signal processing device 105 of the fifth example embodiment to which a third change detection unit 150 is added.

Figure 28:
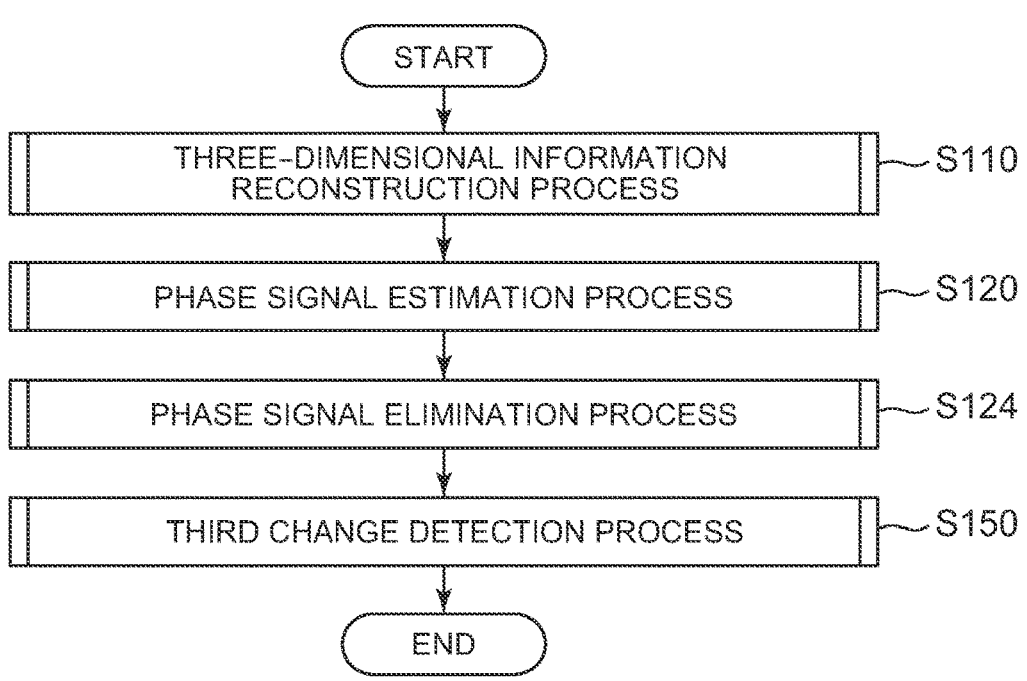
FIG. 28 It depicts a flowchart showing the signal processing performed by the signal processing device of the sixth example embodiment.

Next, the overall operation of the signal processing device 106 of the sixth example embodiment will be explained with reference to the flowchart in FIG. 28. The process shown in FIG. 28 is a process in which the third change detection process (step S150) performed by the third change detection unit 150 is added to the processes (steps S110, S120, S124) in the fifth example embodiment shown in FIG. 25.

Figure 29:
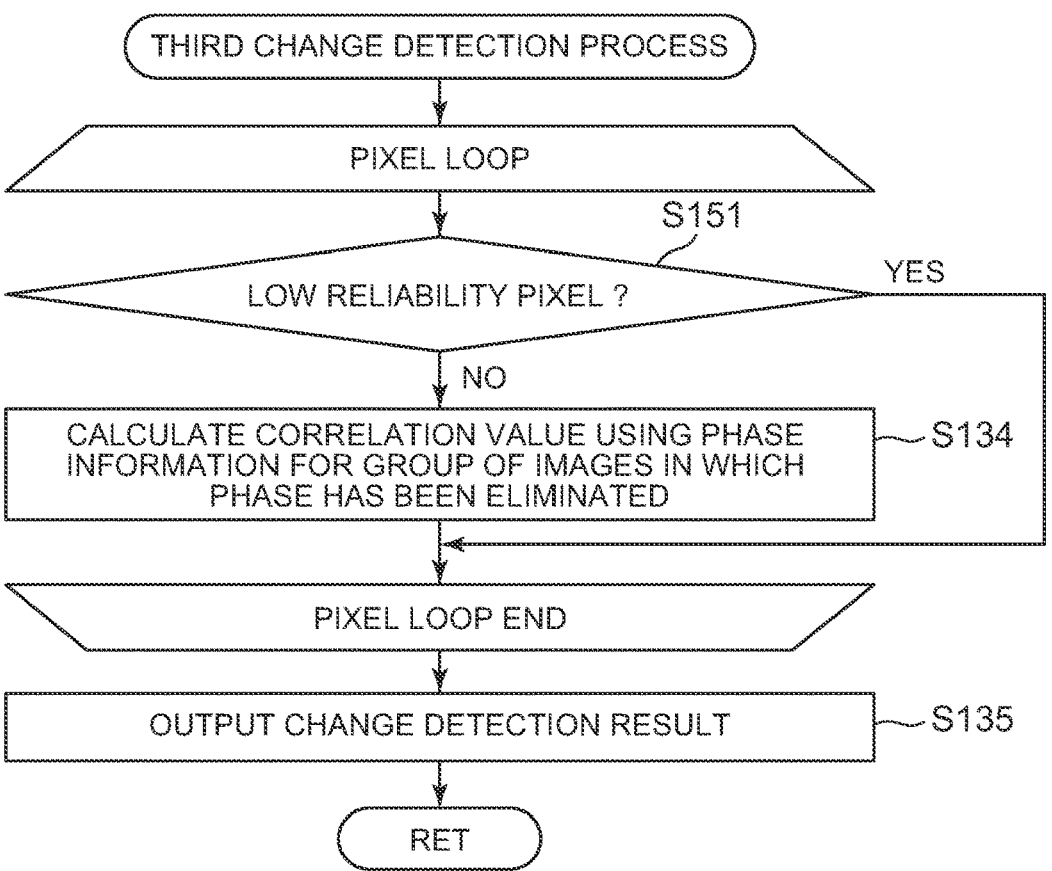
FIG. 29 It depicts a flowchart showing the third change detection process in the sixth example embodiment.

Next, the third change detection process (step S150) shown in FIG. 28 will be explained with reference to FIG. 29. FIG. 29 is a flowchart showing the third change detection process.

The third change detection unit 150 repeats the processes of steps S151 and S134 (correlation process) until the correlation values for all pixels are calculated among multiple SAR images to be analyzed. In other words, the third change detection unit 150 performs pixel loop processing. For example, the third change detection unit 150 determines that the reliability is low when the value indicated by the reliability information is smaller than a predetermined threshold value in the process of step S151. When the process of step S134 has been performed for all pixels, the pixel loop is terminated.

In step S134, the third change detection unit 150 calculates the correlation of the selected pixels in the multiple SAR images to be analyzed. The selected pixels are pixels at the same position in the multiple SAR images to be analyzed. The process in step S134 is the same as the process performed by the first change detection unit 130 in the third example embodiment (refer to FIG. 20).

After exiting the pixel loop, the third change detection unit 150 outputs the change detection result including the calculated correlation for each pixel (step S135).

In this example embodiment, change detection is performed using phase signals for pixels with high reliability (refer to FIG. 29). In other words, change detection is performed using the phase signals that could not be completely eliminated by the phase signal elimination process in step S124 shown in FIG. 26. It should be noted that the phase signals that could not be completely eliminated by the phase signal elimination process are phase signals other than those caused by the presence of structures and other objects that are regularly present.

Example Embodiment 7

Figure 30:
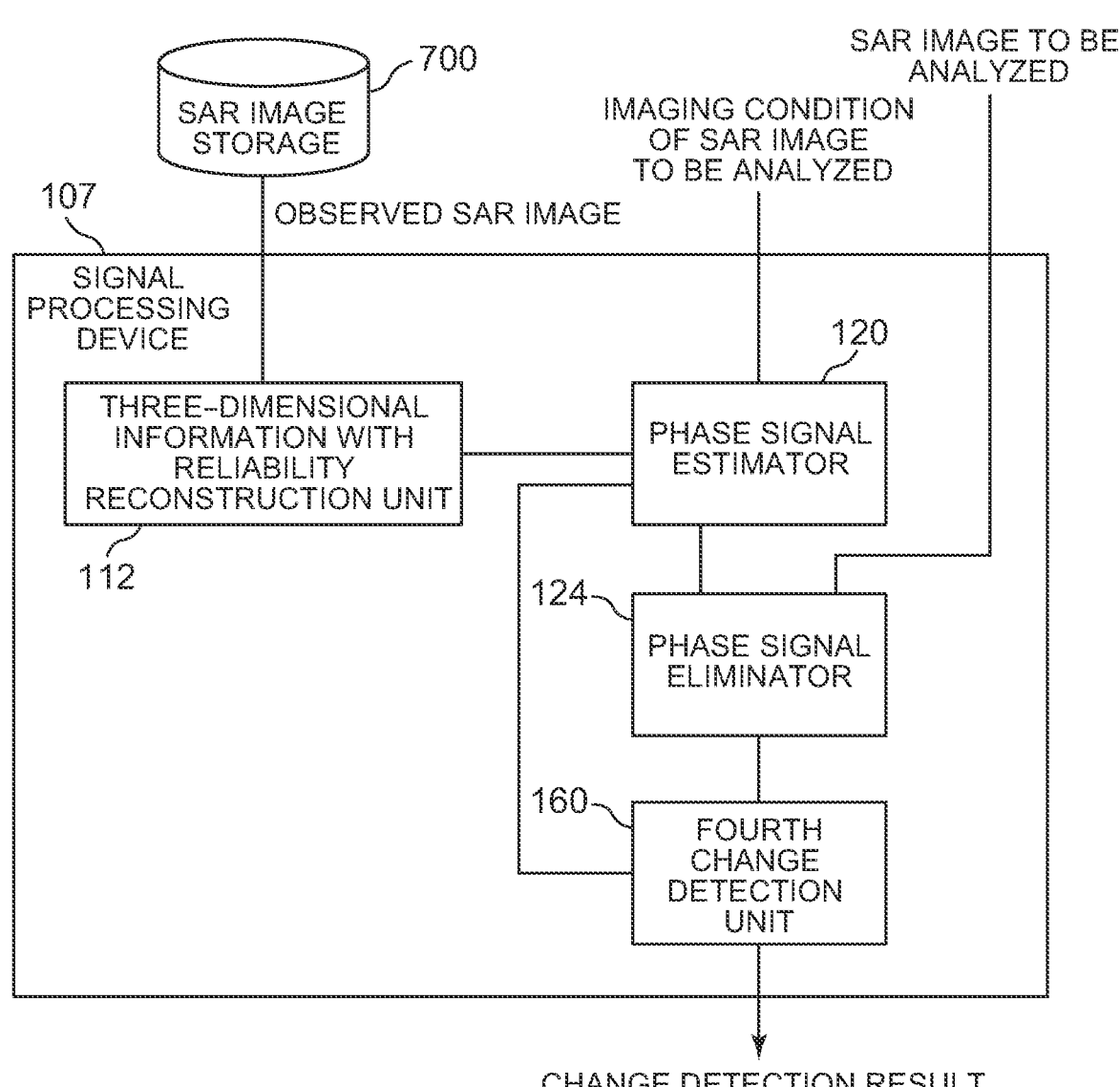
FIG. 30 It depicts a block diagram showing a configuration example of the signal processing device of the seventh example embodiment.

FIG. 30 is a block diagram showing an example configuration of the signal processing device of the seventh example embodiment. The signal processing device 107 shown in FIG. 30 corresponds to the signal processing device 105 of the fifth example embodiment to which a fourth change detection unit 160 is added.

Next, the overall operation of the signal processing device 107 of the seventh example embodiment will be explained with reference to the flowchart in FIG. 31.

Figure 25:
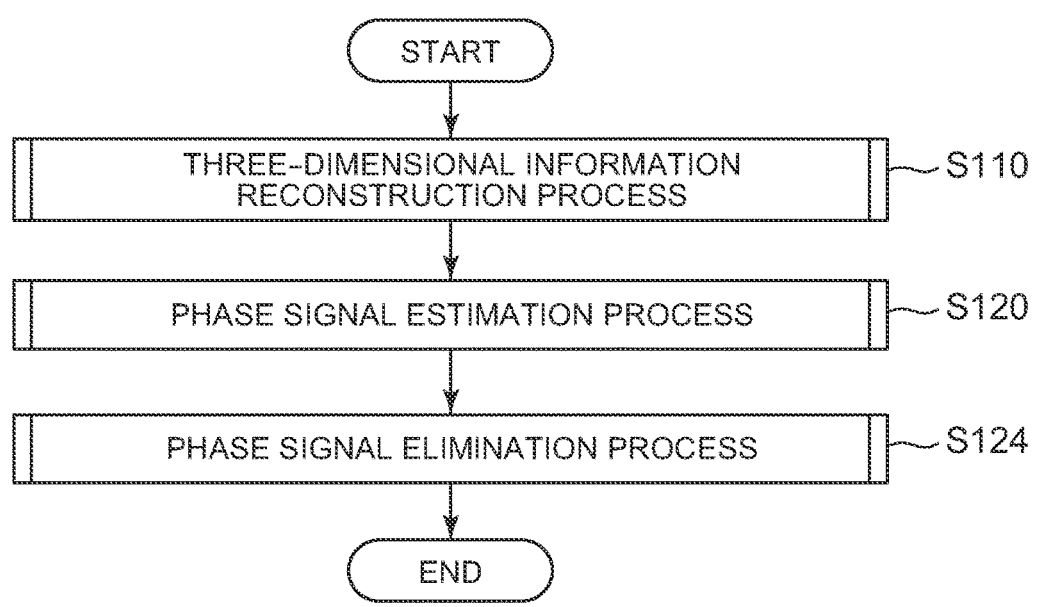
FIG. 25 It depicts a flowchart showing the signal processing performed by the signal processing device of the fifth example embodiment.
Figure 31:
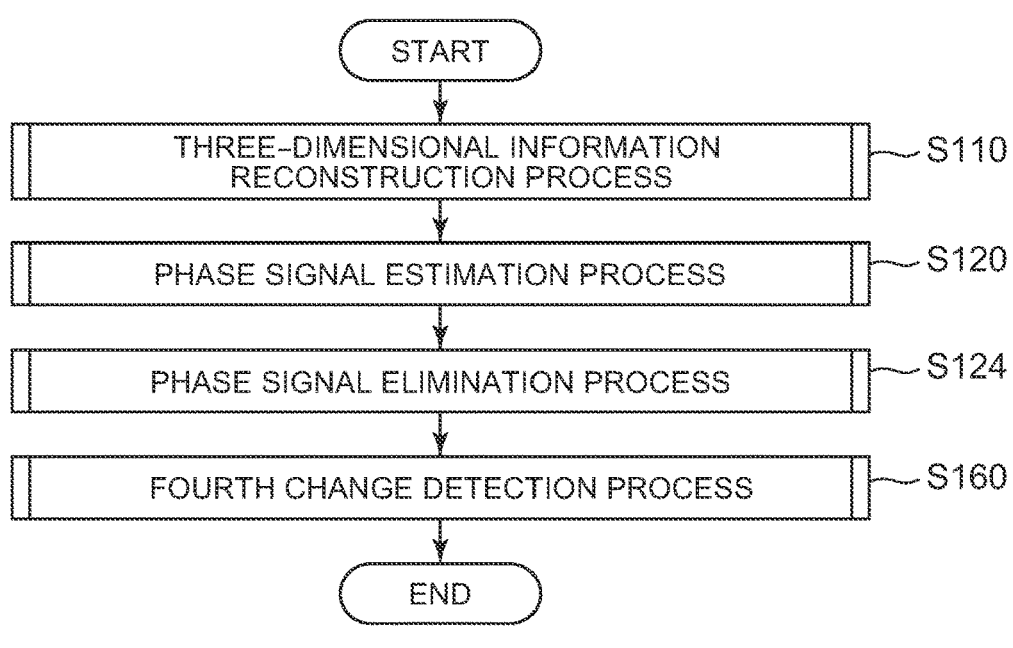
FIG. 31 It depicts a flowchart showing the signal processing performed by the signal processing device of the seventh example embodiment.

The process shown in FIG. 31 is a process in which the fourth change detection process (step S160) performed by the fourth change detection unit 160 is added to the processes (steps S110, S120, S124) in the fifth example embodiment shown in FIG. 25.

Figure 32:
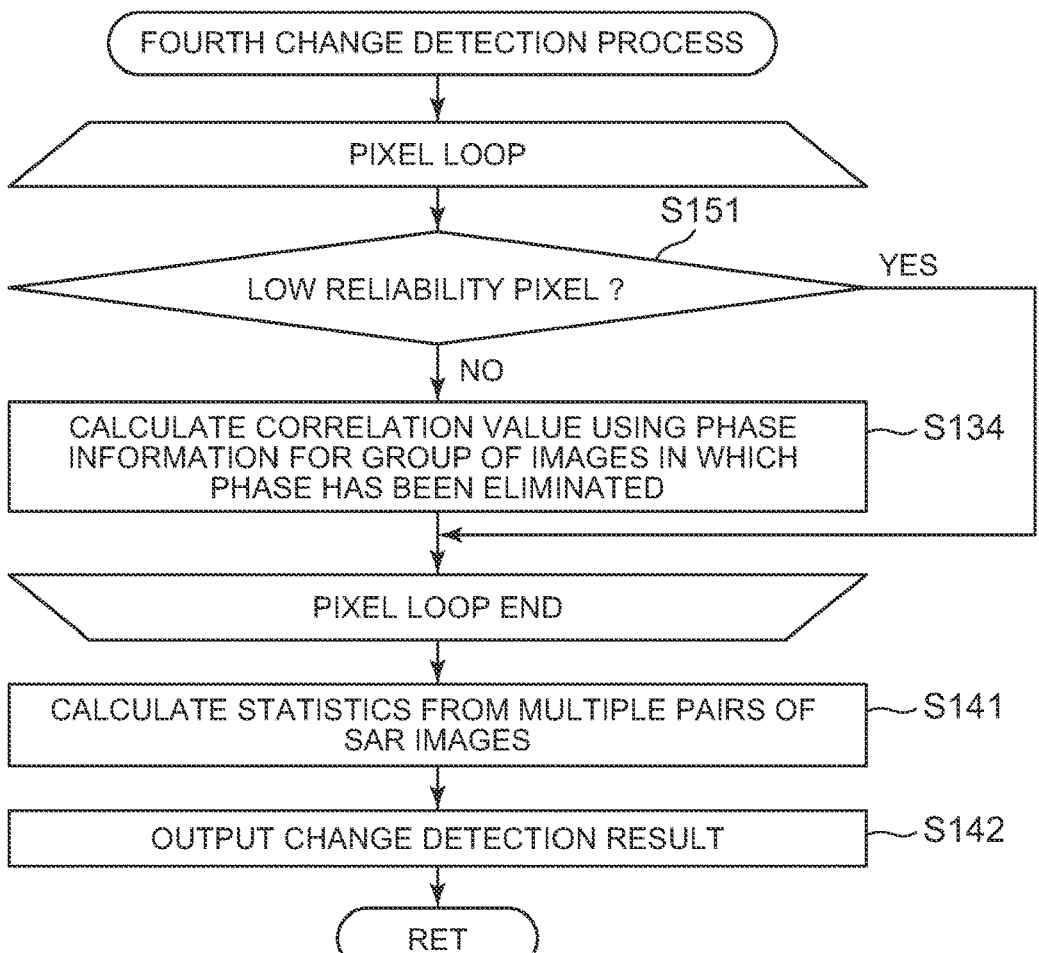
FIG. 32 It depicts a flowchart showing the fourth change detection process in the seventh example embodiment.

Next, the fourth change detection process (step S160) shown in FIG. 31 will be explained with reference to FIG. 32. FIG. 32 is a flowchart showing the fourth change detection process.

The processes of steps S151 and S134 performed by the fourth change detection unit 160 are the same as the processes performed by the third change detection unit 150 in the sixth example embodiment (refer to FIG. 29).

After exiting the pixel loop, the fourth change detection unit 160 calculates the statistics of the values calculated by correlation processes of each pairs (step S141). Then, the fourth change detection unit 160 outputs the change detection result including the calculated statistics (step S142).

Figure 33:
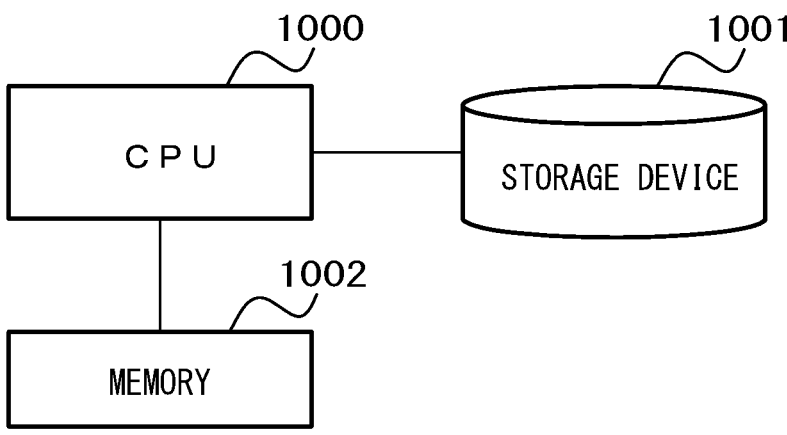
FIG. 33 It depicts a block diagram showing an example of a computer having a CPU.

FIG. 33 is a block diagram showing an example of a computer having a CPU. The computer is implemented in the signal processing device of each of the above example embodiments. The CPU 1000 executes processing in accordance with a signal processing program (software component: codes) stored in a storage device 1001 to realize the functions in the above example embodiments. That is, the computer realizes the functions of the three-dimensional information with reliability reconstruction units 111, 112, 211, the phase signal estimators 120, 121, 211, the phase signal eliminators 122, 124, the first change detection unit 130, the second change detection unit 140, the third change detection unit 150, and the fourth change detection unit 160 in the signal processing devices 101, 102, 103, 104, 105, 106, 107, 201 shown in FIG. 7, FIG. 15, FIG. 18, FIG. 21, FIG. 24, FIG. 27, FIG. 30, and FIG. 8.

The storage device 1001 is, for example, a non-transitory computer readable media. The non-transitory computer readable medium is one of various types of tangible storage media. Specific examples of the non-transitory computer readable media include a magnetic storage medium (for example, hard disk), a magneto-optical storage medium (for example, magneto-optical disk), a CD-ROM (Compact Disc-Read Only Memory), a CD-R (Compact Disc-Recordable), a CD-R/W (Compact Disc-ReWritable), and a semiconductor memory (for example, a mask ROM, a PROM (programmable ROM), an EPROM (Erasable PROM), a flash ROM).

The program may be stored in various types of transitory computer readable media. The transitory computer readable medium is supplied with the program through, for example, a wired or wireless communication channel, i.e., through electric signals, optical signals, or electromagnetic waves.

A memory 1002 is a storage means implemented by a RAM (Random Access Memory), for example, and temporarily stores data when the CPU 1000 executes processing. It can be assumed that a program held in the storage device 1001 or a temporary computer readable medium is transferred to the memory 1002 and the CPU 1000 executes processing based on the program in the memory 1002.

The SAR image storage 700 can be formed in the storage device 1001.

Figure 34:
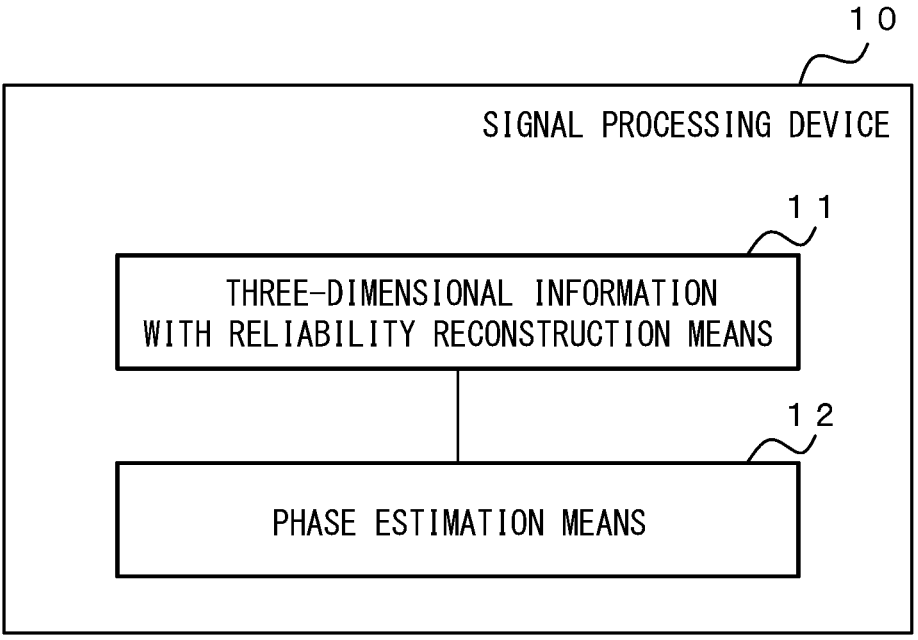
FIG. 34 It depicts a block diagram showing the main part of the signal processing device.

FIG. 34 is a block diagram showing the main part of the signal processing device. The signal processing device 10 shown in FIG. 34 comprises a three-dimensional information with reliability reconstruction unit (three-dimensional information with reliability reconstruction means) 11 (in the example embodiments, realized by the three-dimensional information reconstruction units with reliability 111, 112, 211) which generates three-dimensional information with reliability including three-dimensional information involving intensity and an estimated value of a phase at a three-dimensional position reconstructed using observed SAR images and imaging conditions, and information indicating reliability of the three-dimensional information, and a phase signal estimation unit (phase signal estimation means) 12 (in the example embodiments, realized by the phase eliminators 120, 121, and 221) which calculates phase signals for all pixels in an analyzed area for all imaging conditions of SAR images to be analyzed, and calculates the information indicating reliability of the phase signals based on the information indicating reliability of the three-dimensional information.

The signal processing device 10 may comprise phase elimination means (in the example embodiments, realized by the phase signal eliminator 122) for eliminating the phase signals for the pixels in the analyzed area, referring to the information indicating reliability of the phase signal.

The signal processing device 10 may comprise first change detection means (in the example embodiments, realized by the first change detection unit 130) for detecting change in the analyzed area using the SAR image of the analyzed area in which the phase signals have been eliminated.

The signal processing device 10 may comprise second change detection means (in the example embodiments, realized by the second change detecting unit 140) for detecting change in the analyzed area using the SAR image of the analyzed area in which the phase signals have been eliminated, wherein the second change detection means calculates a degree of similarity of each SAR image to be analyzed for each pair of multiple SAR images to be analyzed, and detects the change using multiple calculated degrees of similarity.

The signal processing device 10 may comprise phase elimination means (in the example embodiments, realized by the phase signal eliminator 124) for eliminating phase signals for the pixels in the analyzed area.

The signal processing device 10 may comprise third change detection means (in the example embodiments, realized by the third change detection unit 150) for detecting change in the analyzed area using the SAR image of the analyzed area in which the phase signals have been eliminated, referring to the information indicating reliability of the phase signals.

The signal processing device 10 may comprise fourth change detection means (in the example embodiments, realized by the fourth change detecting unit 160) for detecting change in the analyzed area using the SAR image of the analyzed area in which the phase signals have been eliminated, referring to the information indicating reliability of the phase signals, wherein the fourth change detection means calculates a degree of similarity of each SAR image to be analyzed for each pair of multiple SAR images to be analyzed, and detects the change using multiple calculated degrees of similarity.

The invention claimed is:

1. A signal processing device comprising:
a memory storing software instructions; and
one or more processors configured to execute the software instructions to:
record received signals to generate observed SAR images;
generate three-dimensional information with reliability including three-dimensional information involving intensity and an estimated value of a phase at a three-dimensional position reconstructed using the observed SAR images and imaging conditions, and information indicating reliability of the three-dimensional information; and
calculate phase signals for all pixels in an analyzed area for the imaging conditions of SAR images to be analyzed, and calculate the information indicating reliability of the phase signals based on the information indicating reliability of the three-dimensional information.

2. The signal processing device according to claim 1, wherein the one or more processors are configured to execute the software instructions to calculate the information indicating reliability of the three-dimensional information by evaluating a discrepancy between a received signal and a predicted signal predicted from the generated three-dimensional information for each of the intensity and the phase.

3. The signal processing device according to claim 1, wherein the one or more processors are configured to execute the software instructions to evaluate how reliable each estimate in the generated three-dimensional information is among possible values.

4. The signal processing device according to claim 1, wherein the one or more processors are configured to execute the software instructions to calculate a function that expresses information on how reliable what values are for the intensity and the phase at each position in a three-dimensional space as three-dimensional information with reliability.

5. The signal processing device according to claim 1, wherein the one or more processors are configured to further execute the software instructions to eliminate the phase signals for the pixels in the analyzed area, referring to the information indicating reliability of the phase signal.

6. The signal processing device according to claim 5, wherein the one or more processors are configured to further execute the software instructions to perform a first change detection process for detecting change in the analyzed area using the SAR image of the analyzed area in which the phase signals have been eliminated.

7. The signal processing device according to claim 5, wherein the one or more processors are configured to further execute the software instructions to perform a second change detection process for detecting change in the analyzed area using the SAR image of the analyzed area in which the phase signals have been eliminated, and
wherein in the second change detection process, the one or more processors are configured to execute the software instructions to calculate a degree of similarity of each SAR image to be analyzed for each pair of multiple SAR images to be analyzed, and detect the change using multiple calculated degrees of similarity.

8. The signal processing device according to claim 1, wherein the one or more processors are configured to further execute the software instructions to eliminate phase signals for the pixels in the analyzed area.

9. The signal processing device according to claim 8, wherein the one or more processors are configured to further execute the software instructions to detect change in the analyzed area using the SAR image of the analyzed area in which the phase signals have been eliminated, referring to the information indicating reliability of the phase signals.

10. The signal processing device according to claim 8, wherein the one or more processors are configured to further execute the software instructions to perform a change detection process for detecting change in the analyzed area using the SAR image of the analyzed area in which the phase signals have been eliminated, referring to the information indicating reliability of the phase signals, and
wherein in the change detection process, the one or more processors are configured to execute the software instructions to calculate a degree of similarity of each SAR image to be analyzed for each pair of multiple SAR images to be analyzed, and detect the change using multiple calculated degrees of similarity.

11. A signal processing method comprising:
recording received signals to generate observed SAR images;
generating three-dimensional information with reliability including three-dimensional information involving intensity and an estimated value of a phase at a three-dimensional position reconstructed using the observed SAR images and imaging conditions, and information indicating reliability of the three-dimensional information; and calculating phase signals for all pixels in an analyzed area for the imaging conditions of SAR images to be analyzed, and calculating the information indicating reliability of the phase signals based on the information indicating reliability of the three-dimensional information.

12. A non-transitory computer readable recording medium storing a signal processing program which, when executed by a processor, performs:

recording received signals to generate observed SAR images;

generating three-dimensional information with reliability including three-dimensional information involving intensity and an estimated value of a phase at a three-dimensional position reconstructed using the observed SAR images and imaging conditions, and information indicating reliability of the three-dimensional information; and calculating phase signals for all pixels in an analyzed area for the imaging conditions of SAR images to be analyzed, and calculating the information indicating reliability of the phase signals based on the information indicating reliability of the three-dimensional information.

* * * * *